United States Patent

Inagaki et al.

[11] Patent Number: 6,107,243
[45] Date of Patent: *Aug. 22, 2000

[54] CLUSTER-INCLUDED MATERIAL

[75] Inventors: Shinji Inagaki; Noriaki Sugimoto; Tatsumi Hioki, all of Nagoya; Yoshiaki Fukushima, Aichi-ken; Masaru Ichikawa, Sapporo, all of Japan

[73] Assignee: Kabushiki Kaisha Toyota Chuo Kenkyusho, Aichi-gun, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,769

[22] Filed: Sep. 9, 1997

[30] Foreign Application Priority Data

Sep. 9, 1996 [JP] Japan ................ 8-261363

[51] Int. Cl.$^7$ .......................... B01J 20/10
[52] U.S. Cl. .................. 502/407; 502/104; 502/107; 428/116; 428/312.6; 428/446
[58] Field of Search ................... 502/80, 81, 84, 502/104, 107, 407, 527.11; 428/116, 312.6, 446; 264/413, 41, 56

[56] References Cited

U.S. PATENT DOCUMENTS

| | | | |
|---|---|---|---|
| 4,703,029 | 10/1987 | Rieck et al. ................ | 502/243 |
| 4,968,652 | 11/1990 | Johnson et al. ............. | 502/63 |
| 5,293,037 | 3/1994 | Le Mehaute et al. ........ | 250/214.1 |
| 5,334,368 | 8/1994 | Beck et al. ................. | 423/704 |
| 5,347,060 | 9/1994 | Hellring et al. ............. | 570/235 |
| 5,348,687 | 9/1994 | Beck et al. . | |
| 5,350,930 | 9/1994 | Schmid et al. .............. | 257/14 |
| 5,382,558 | 1/1995 | Inagaki et al. . | |
| 5,393,329 | 2/1995 | Inagaki et al. .............. | 96/131 |
| 5,508,081 | 4/1996 | Inagaki et al. . | |
| 5,599,759 | 2/1997 | Inagaki et al. . | |

FOREIGN PATENT DOCUMENTS 7-72520  3/1995  Japan .

OTHER PUBLICATIONS

N. Herron et al, J. Am. Chem. Soc. vol. 111, No. 2, 530–540 (1989).
T. Yanagisawa et al., Bull. Chem. Soc. Jpn., 63, 988–922 (1990).
S. Inagaki et al., J. Chem. Soc. Chem. Commun., No. 8, 680–682 (1993).
C.T. Kresge et al, Nature, vol. 359, 710–712 (1992).

*Primary Examiner*—Tom Dunn
*Assistant Examiner*—Cam N. Nguyen
*Attorney, Agent, or Firm*—Oblon, Spivak, McClelland, Maier & Neustadt, P.C.

[57] ABSTRACT

The present cluster-included material characterized by utilizing a porous host material for clusters having a pore larger in size than that of zeolite. The cluster-included material is obtained by forming a cluster in a pore of a mesoporous material having a pore size of 1.3 to 10 nm. When the mesoporous material is particularly a mesoporous material having a pore volume of not less than 60% of a total pore volume within a pore size range of −40 to +40% of a pore size which shows a maximum peak in a pore size distribution curve, a granular cluster having a uniform particle size or a fine-linear cluster having a uniform diameter is obtained. The cluster-included material performs the various quantum effects.

25 Claims, 27 Drawing Sheets

| EXAMPLE | MESOPOROUS MATERIAL | d-VALUE(nm) AT PEAK IN X-RAY DIFFRACTION PATTERN | | | |
|---|---|---|---|---|---|
| 1 | FSM/8 | 2.7 | | | |
|  | FSM/10 | 3.1 | 1.7 | | |
|  | FSM/12 | 3.3 | 1.8 | 1.6 | |
|  | FSM/14 | 3.4 | 2.0 | 1.7 | 1.3 |
|  | FSM/16 | 3.8 | 2.2 | 1.8 | 1.4 |
| 2 | FSM/M05 | 4.6 | 2.7 | 2.2 | 1.7 |
|  | FSM/M10 | 5.1 | 2.9 | | |
|  | FSM/M20 | — | | | |
| 3 | FSM/16P | 3.8 | 2.2 | 1.9 | 1.5 |
|  | FSM/16D | 4.1 | 2.3 | 2.0 | 1.5 |

FIG.3

| EXAMPLE | MESOPOROUS MATERIAL | MEAN PORE SIZE (nm) | WHOLE PORE VOLUME (cc/g) | ±40% VOLUME RATIO (%) |
|---|---|---|---|---|
| 1 | FSM/8 | 1.5 | 0.26 | 61 |
|  | FSM/10 | 1.9 | 0.51 | 77 |
|  | FSM/12 | 2.3 | 0.65 | 73 |
|  | FSM/14 | 2.3 | 0.85 | 80 |
|  | FSM/16 | 2.8 | 1.04 | 64 |
| 2 | FSM/M05 | 3.2 | 1.03 | 68 |
|  | FSM/M10 | 3.6 | 1.20 | 63 |
|  | FSM/M20 | 4.7 | 1.22 | 60 |
| 3 | FSM/16P | 2.8 | 0.70 | 71 |
|  | FSM/16D | 3.3 | 0.90 | 87 |
| COMPARATIVE SAMPLE | SILICA GEL | 2.3 | 0.46 | 35 |
|  | ZEOLITE | 0.5 | 0.16 | >90 |

FIG. 8

|  | H₂O/Si MOLAR RATIO | DENSITY (g/cc) | SPECIFIC SURFACE AREA (m²/g) |
|---|---|---|---|
| PRESENT INVENTION | 2 | 0.71 | 1066 |
|  | 4 | 0.55 | 1022 |
| COMPARATIVE SAMPLE | 12 | 0.38 | 950 |
|  | 32 | 0.35 | 765 |

| | DENSITY (g/cc) | SPECIFIC SURFACE AREA (m²/g) |
|---|---|---|
| DECYLTRIMETHYLAMMONIUM BROMIDE | 0.66 | 712 |
| OCTYLTRIMETHYLAMMONIUM BROMIDE | 0.65 | 650 |

CLUSTER-INCLUDED MATERIAL

BACKGROUND OF THE INVENTION

1. Field of the Invention

The present invention relates to a cluster-included material comprising granular or thin linear clusters, each cluster having a preferable size, and a method for producing the same.

2. Related Art

An intensive study on practical application of a technique of utilizing the quantum effect by micronizing the size of substances to such a degree that the quantum effect is obtained by the substances has recently begun. For example, when the thickness of an active layer of a semiconductor laser is reduced to a value smaller than that of the de Broglie's wavelength of carriers, a quantum well laser is obtained. According to this quantum well laser, various characteristics are improved, for example, increase in differential gain and relaxation of oscillation frequency, decrease in spectral line width and the like.

In case of the above quantum well laser, the thickness of the layer called the active layer is reduced but the area thereof becomes larger. A trial of increasing the number of dimensions to be micronized is made, and a study of realizing those for micronizing the region or substance to the thin linear form (referred to as a "quantum wire")and those for micronizing to the dot form (referred to as a "quantum dot") is made. In the quantum wire, substance is micronized in two-dimension and a one-dimensional electron system is obtained. In the quantum dot, substance is micronized in three-dimension and a zero-dimensional electron system is obtained. By making the line thin to such a degree that the quantum effect is obtained (quantum wire) or making the particle small to such a degree that the quantum effect is obtained (quantum dot), characteristics of electron devices are improved or realization of electron devices based on a quite new physical phenomenon is expected.

For example, when the quantum dot laser is realized, not only the above mentioned characteristics of the quantum well laser is further improved but also the other characteristics are improved, e.g. decrease in threshold current, and temperature dependence of the threshold current and the like.

As the method of realizing the microstructure of the substance wherein the improvement of various characteristics are expected, for example, there are suggested use of lithography (production of quantum wires and quantum dots), deposition of clusters by means of a heat treatment of a mixed crystal substance, metal or semiconductor particles-dispersed glass, etc. (production of quantum dots), direct production of clusters by means of a dry process (production of quantum dots), utilization of a one-dimensional polymer (production of quantum wires), utilization of a porous silicon substance (utilization of quantum wires and/or quantum dots) and the like.

In addition to these techniques, a method of embedding clusters into pores (voids) of a previously prepared porous substance is made.

As one of this kind of trials, a technique described in N. Herron et al., J. Am. Chem. Soc. Vol. 111, No. 2, 530 (1989) is known.

According to this technique, cadmium sulfide (CdS) clusters are deposited in pores in a zeolite crystal by using the zeolite crystal as a porous substance. Each pore in the zeolite crystal has a diameter of not more than 1 nm, and the quantum dot is produced.

Furthermore, another technique includes a technique described in Japanese Patent Kokai Publication No. 7-72520. According to this technique, a compound semiconductor is embedded into voids of a zeolite crystal by utilizing ion exchange and/or gas adsorption. Particularly, the compound semiconductor is embedded into the above voids by applying visible light or ultraviolet light to the above zeolite crystal.

These techniques have an advantage that, since clusters are embedded into pores of the zeolite crystal wherein the pores are regularly arranged, a microstructure of clusters corresponding to the crystal structure of the zeolite crystal can be obtained.

Particularly, according to the technique described in Japanese Patent Kokai Publication No. 7-72520, since visible light or ultraviolet light is applied to compound introduced into voids in the zeolite crystal, bonding between components of the compound is accelerated by the photochemical reaction and clusters of a compound semiconductor are formed in the zeolite crystal in high efficiency. Consequently, the compound semiconductor is embedded into the above void, easily and efficiently.

However, these prior arts had the following problems because the zeolite crystal is used as a host for forming the cluster.

The diameter of the pore of the zeolite crystal is not more than several nm, normally not more than 1 nm. Since the diameter of this pore is too small, the embedding rate of the cluster into the pores is reduced. That is, the cluster density in the zeolite crystal could not be increased sufficiently and, therefore, characteristics required for practical application could not be obtained.

There sometimes arises a problem that, since the pore is too small, the size of the cluster to be formed in the pore of the zeolite crystal is also too small.

The present invention is based on the fact that the above knowledge has been found as a result of intensive study about the cause of the problems which arise in case of utilizing the zeolite crystal.

SUMMARY OF THE INVENTION

Thus, an object of the present invention is to provide a cluster-included material comprising a plurality of clusters which exhibit good characteristics by utilizing a porous material with pores, each pore having a size larger than that of the zeolite crystal as a host for the clusters.

In order to accomplish the above object, the present inventors have accomplished the following invention. That is, regarding the cluster-included material according to one aspect of the present invention, clusters are formed in pores of a mesoporous material, each pore having a pore diameter of 1.3 to 10 nm. A porous material having pore sizes that fall between 1 nm and 10 nm and are distributed within a narrow range is herein referred to as a mesoporous material.

When the mesoporous material with the above pore size is utilized as the host for the clusters and the clusters are formed by using the pores in the host as a template, the clusters are formed in a high density, and each cluster has a preferable size in which the quantum effect is obtained.

It is preferred that the mesoporous material has a pore volume of not less than 60% of a total pore volume within a pore size range of −40 to +40% of a pore size which shows a maximum peak in a pore size distribution curve.

When the clusters are formed by using the pores of the mesoporous material with such a pore size distribution, a granular clusters having a uniform particle size or thin line clusters having a uniform diameter are formed.

It is further preferred that the mesoporous material has such a powder X-ray diffraction pattern having one or more peaks at a diffraction angle corresponding to a d-value of not less than 1 nm.

Since the host for the clusters having such a powder X-ray diffraction pattern has a regularly arranged pore structure, the clusters formed in the pores have also a regular structure. Examples of the mesoporous materials are disclosed in U.S. Pat. No. 5,382,558 and U.S. Pat. No. 5,599,759, which are herein incorporated by reference.

In the cluster-included material wherein the clusters are formed in the pores of the mesoporous material, the total weight of the clusters is preferably not less than 10% of the weight of the mesoporous material.

When the above weight relation is established, it becomes possible to utilize characteristics expressed by the cluster in high efficiency.

It is preferred that the clusters are any one of a metal, a compound semiconductor and a ceramic.

When the clusters are any one of a metal, a compound semiconductor and a ceramic, physical properties of the clusters are imparted to the cluster-included material.

It is preferred that each cluster is in the form of a granule comprising 10 to 10,000 atoms.

When each cluster is in the form of a granule having the above number of the atoms, there can be realized a cluster-included material which can be utilized as the quantum dot.

Another preferred form of the cluster is a thin line having a diameter of 1.3 to 10 nm.

When the linear cluster is formed, there can be realized a cluster-included material which can be utilized as the quantum wire.

The above objects as well as other objects, features and effects of the present invention will become more apparent from the following embodiments with reference to the accompanying drawings and the appended claims.

BRIEF DESCRIPTION OF THE DRAWINGS

FIG. 3 is a chart showing a peak d-value in an X-ray diffraction pattern of the mesoporous materials obtained in Examples 1 to 3.

FIG. 8 is a chart showing a mean pore size, a whole pore volume and a +40% volume ratio of the mesoporous materials obtained in Examples 1 to 3 as well as silica gel and zeolite as Comparative Examples.

FIG. 14($b$) is a graph showing a secondary water vapor adsorption isotherm of the mesoporous material of Example 6.

DESCRIPTION OF THE PREFERRED EMBODIMENTS

The present invention will be described below in more detail. The present invention provides a cluster-included material comprising clusters, each cluster having a preferable size to realize the quantum effect. The mesoporous material used as a host for the clusters has pores, each pore having a diameter of 1.3 to 10 nm.

(Mesoporous material)

The mesoporous material used in the present invention is a porous material with pores, each having a pore size of 1.3 to 10 nm (also referred to as a "mesopore"). An arbitrary porous material having such a mesopore can be used.

Regarding the mesoporous material used in the present invention, it is particularly preferred that a volume of not less than 60% of a total pore volume is included within a diameter range from −40% to +40% of a pore size (mean pore diameter) which shows a maximum peak in a pore size distribution curve. The pore size distribution curve of the mesoporous material refers to a curve obtained by plotting a value (dV/dD) (obtained by differentiating a pore volume (V) by a pore diameter (D)) against the pore size or diameter (D). The pore size distribution curve can be formed, for example, by a gas adsorption method. In this method, nitrogen gas is frequently used. First, nitrogen gas is introduced in a sample as an adsorbent material at a liquid nitrogen temperature (−196° C.) and the adsorption amount is determined by a volumetrical method or a gravimetrical method. An adsorption isotherm is formed by increasing the pressure of the nitrogen gas to be introduced step by step and plotting the adsorption amount of the nitrogen gas against each equilibrium pressure. The above pore size distribution is determined from this adsorption isotherm, for example, using a calculation method such as Cranston-Inklay method, Pollimore-Heal method and the like.

Figure 6:
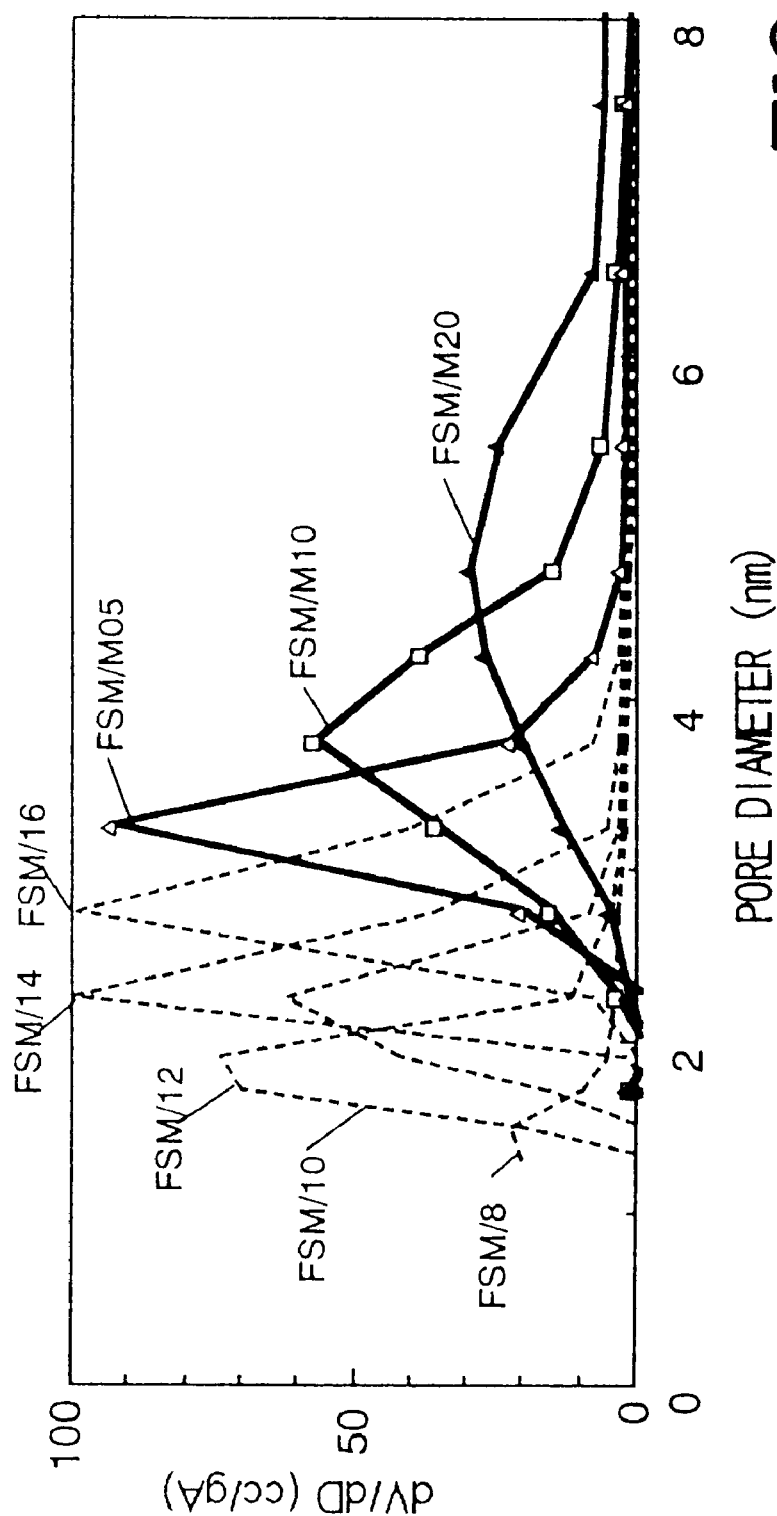
FIG. 6 is a graph showing a pore size distribution curve of the mesoporous materials obtained in Examples 1 and 2.

The fact that the pore volume of not less than 60% of the total pore volume is included within the diameter range from −40% to +40% of the pore diameter which shows a maximum peak in the pore size distribution curve means the followings, specifically. For example, as shown in FIG. 6, if the diameter which gives the maximum peak (FSM/16) in the pore size distribution curve is 2.8 nm, not less than 60% of the total pore volume is occupied by the total volume of the pores whose pore diameter are within the range from 1.68 nm (2.8×0.6) to 3.92 nm (2.8×1.4). Specifically, it means that not less than 60% of the total integrated value of the curve is occupied by the integrated value of the pore size distribution curve wherein the pore diameter is within the range from 1.68 nm to 3.92 nm. FSM/16 of FIG. 6 satisfies the above relation.

It is preferred that the mesoporous material used in the present invention has one or more peaks at a diffraction angle corresponding to a d-value of not less than 1 nm in the X-ray diffraction pattern. The peak of the X-ray diffraction pattern indicates that the sample has a periodic structure of the d-value corresponding to the peak angle. The above X-ray diffraction pattern shows that the sample has a structure where pores are regularly arranged with the distance of not less than 1 nm. That is, it can be said that the mesoporous material having the above diffraction pattern has the regularity in pore distribution due to the regularity of the structure shown by the diffraction pattern.

The shape of the each pore of the mesoporous material used in the present invention may be a one-dimensionally extended tunnel-like (linear) shape, or a granular shape for forming an empty box at one point in the space.

The form of the mesoporous material of the present invention may be a form of a powder, a granule, a bulk solid, a honeycomb, a membrane or a thin film coated on a substrate. It may also be a form of a membrane coated on the honeycomb matrix. Examples of a method of forming the mesoporous material into a granule include a method of powder compression, a method of mixing with a liquid and drying the mixture, etc., but are not limited thereto. In case of forming it into a granule or coating the honeycomb matrix with it, a suitable binder may be used.

The composition of these mesoporous materials may contain aluminum (Al), titanium (Ti), magnesium (Mg), zirconium (Zr), molybdenum (Mo), cobalt (Co), nickel (Ni), gallium (Ga), beryllium (Be), yttrium (Y), lanthanum (La), tin (Sn), lead (Pb), vanadium (V), boron (B), etc., in addition to silica.

One preferred mesoporous material used in the present invention is a mesoporous material synthesized by reacting a layered silicate with a surfactant (T. Yanagisawa et al., Bull. Chem. Soc. Jpn., 63, 988–992 (1990)). This mesoporous material has such a structure that periodically curved silicate sheets are bonded each other at the concave portion, and numberless uniformly arranged pores are present in the gaps between the sheets. The pore diameter is distributed within the narrow range of 1 to 10 nm. Regarding the X-ray diffraction pattern of this mesoporous material, at least one peak including a diffraction peak having a maximum intensity was observed at the position having a d-value of not less than 2 nm. Regarding some of them, 2 to 4 diffraction peaks showing a hexagonal structure were observed and, furthermore, pores arranged in the honeycomb form were observed in the electron micrograph (S. Inagaki et al., J. Chem. Soc. Chem. Commun., No. 8, 680–682(1993)).

Another mesoporous material suitable for this invention is a mesoporous molecular sieve (M41S) synthesized by using a micellar structure of a surfactant as a template (C. T. Kresge et al., Nature, 359, 710–712 (1992)). This M41S has a structure that pores having a diameter of 2 to 10 nm are regularly arranged, and the pore diameter is also distributed within the narrow range. Some type (MCM-41) of the molecular sieve (M41S) has a hexagonal structure having a honeycomb cross section similar to the mesoporous material synthesized from the previously mentioned layered silicate, but differs from the previously mentioned material in the pore wall. Regarding the X-ray diffraction pattern of M41S, at least one peak including a diffraction peak having a maximum intensity was observed at the position having a d-value of not less than 2 nm.

In all of these mesoporous materials, at least one peak was observed at the angle corresponding to a d-value of not less than 2 nm. This X-ray pattern corresponds to the structure where pores having a diameter of 1 to 10 nm are regularly arranged with a distance of not less than 2 nm.

(Method for production of mesoporous material)

A method of synthesizing a mesoporous material from a layered silicate will be described below. As the layered silicate, for example, kanemite ($NaHSi_2O_5 \cdot 3H_2O$) is preferred. Other typical examples include a sodium disilicate crystal ($\alpha, \beta, \gamma, \delta$ —$Na_2Si_2O_5$), makatite ($Na_2Si_4O_9 \cdot 5H_2O$), ilerite ($Na_2Si_8O_{17} \cdot xH_2O$), magadiite ($Na_2Si_{14}O_{29} \cdot xH_2O$), kenyaite ($Na_2Si_{20}O_{41} \cdot xH_2O$).

Other than the above-mentioned examples, there can also be used a layered silicate wherein elements other than silicon dioxide are removed by treating a clay mineral such as sepiolite with an aqueous solution. Typical examples of this clay mineral include montmorillonite, vermiculite, mica, kaolinite, smectite, etc., in addition to sepiolite, but are not limited thereto.

In the method of synthesizing the mesoporous material, there may be used sodium silicate, Si alkoxide, silica, etc. in place of the layered silicate.

As the surfactant used in the synthesis of the mesoporous material, there can be used chlorides, bromides, iodides or hydroxides of alkyl trimethyl ammonium, dimethyl alkyl ammonium, alkyl ammonium, benzyl ammonium and the like.

With respect to the synthesis method, the layered silicate is dispersed firstly in a solvent prepared by dissolving the surfactant. As the solvent, water is preferred but a mixed solvent of water and alcohol and other solvents can also be used. The concentration of the surfactant is preferably from 0.05 M to 1 M. The amount of the layered silicate (e.g. kanemite) dispersed is preferably from 5 to 200 g based on 1000 ml of an aqueous solution of the surfactant (0.1 M). This dispersion is heated at 30 to 150° C. The heating time is preferably from 1 to 24 hours. During the heating, the dispersion is preferably stirred. The pH of the dispersion is preferably not less than 10 in first 1 to 5 hours and not more than 10 for the residual time. The pH of the dispersion of kanemite becomes 10 or more, naturally, because kanemite is alkaline. When the pH does not become 10 or more, the pH is adjusted to 10 or more by adding an alkaline such as sodium hydroxide. By this pH control, a mesoporous material having extremely high crystallinity and heat resistance can be obtained. After heating the dispersion, the solid product is recovered by filtration. By repeatedly washing this solid product with deionized water, a mesoporous material having high heat resistance can be obtained. By calcining at the temperature of not less than 550° C. or treating with a hydrochloric acid/ethanol mixed solution after heating this solid product, the surfactant incorporated into the crystal is removed to form a mesoporous material. In case of calcining, it is preferred to heat it in an atmosphere such as air, oxygen, nitrogen, etc. for one or more hours. In place of the hydrochloric acid/methanol solution, there can be used a mixed solution of an acid and an organic solvent of the other combination.

Examples of the method of adding the element other than Si to the above mesoporous material include a method of previously incorporating an element other than Si into the layered silicate as the raw material and a method of adding it in the synthesis step of the above mesoporous material. Examples of the method of incorporating an element into the layered silicate include a method of dissolving a salt of an element other than Si in a silicic acid solution such as water-glass, followed by drying and further calcining to form a layered silicate. Since the elements added are mostly incorporated into a $SiO_4$ framework of the layered silicate, the additive elements are also incorporated into a $SiO_4$ framework of the finally formed mesoporous material. Therefore, catalytically active characteristics such as solid acidity, etc. are expressed.

Examples of the method of adding at the synthesis step of the mesoporous material include a method of impregnating a mesoporous material precursor comprising the layered silicate and surfactant with an aqueous solution of a salt of an element other than Si and calcining the impregnated mesoporous material precursor. According to this method, since the additive element is comparatively adhered to the surface of the mesoporous material, the characteristics of the additive element are effectively expressed.

An alternative method for production of the mesoporous material includes a method of using an alkoxysilane. As the alkoxysilane, there may be used tetramethoxysilane, tetraethoxysilane, tetrapropoxysilane, or alkylalkoxysilane such as methyltrimethoxysilane, etc. Two or more alkoxysilanes can also be used in combination.

As the surfactant, a compound having an alkyl group and a hydrophilic group is used. As the alkyl group, those having 2 to 18 carbon atoms are preferred. Examples of the hydrophilic group include $N^+$, $NH_2$, NO, OH and COOH. Specific examples of the surfactant include those represented by the following general formula (1)

$$CnH_{2n+1}N(CH_3)_3X \tag{1}$$

(wherein n represents an integer of 2 to 18, and X represents a halide ion such as chloride ion, bromide ion, etc. or an organic anion such as acetic acid ion), such as alkyl trimethylammonium, alkyl alcohol, fatty acid and the like. Among them, alkyl trimethylammonium is preferred.

The method for mixing of raw materials is not specifically limited, but is preferably a method of first adding a small amount of water (0.5 to 10 mol of water to 1 mol of Si) to an alkoxysilane and adding a surfactant after stirring at room temperature for about several minutes to 3 hours. When a small amount of an acid is added as a pH adjustor at this time, the respective components are dissolved and a uniform solution can be prepared. The pH of the solution is preferably within the range from 1 to 4. As the acid, diluted hydrochloric acid (e.g. 2N) is often used, but other acids such as nitric acid, sulfuric acid, etc. may also be used. The surfactant may be added in the form of a powder, but may be added after dissolving in a small amount of water.

A molar ratio of $H_2O$ to Si in the raw material means a ratio of Si atoms to the total amount of water added during the synthesis. When the molar ratio of $H_2O$ to Si is not less than 10, for example, the gap between fine particles of a metal oxide formed by hydrolysis/condensation of a metal alkoxide becomes larger, which results in decrease of the density of the resulting metal oxide. On the other hand, when the ratio is less than 1, no hydrolysis of the metal alkoxide arises, which results in no metal oxide.

The amount of the surfactant added is preferably from 1 to 10 mol based on 1 mol of Si in the raw material. When the amount of the surfactant is too large, there arises a problem that excess surfactant which does not contribute to the formation of an inorganic/organic composite material is included in the sample. On the other hand, when the amount is too small, there arises a problem that excess Si which does not contribute to the formation of the composite material is included and, furthermore, the thickness of the silica layer increases and the pore volume decreases.

The solution thus prepared is gradually solidified uniformly when it is allowed to stand. At this time, the solution may be allowed to stand in a sealed vessel or an open vessel, or may be allowed to stand in a state of being coated on the substrate. When it is allowed to stand in the sealed vessel or open vessel, the solution is solidified as it is. It is possible to obtain a sample having a desired particle size by drying the resulting solid, followed by grinding and further sifting. When the solution is coated on the substrate and then allowed to stand, the solution is solidified on the substrate and a film-like sample can be obtained. As the method of coating on the substrate, a spin-coating method, a casting method, a dip-coating method, etc. can be used.

The removal of the surfactant in the solidified organic/inorganic composite material is conducted by a calcining method and a method of treating with an alcohol. According to the calcining method, the organic/inorganic composite material may be heated within the range from 300 to 1000° C., preferably from 400 to 700° C. The heating time may be not less than 30 minutes, but it is preferred to heat for one or more hours so as to completely remove the organic component.

With respect to the atmosphere, air may be passed. However, since a large amount of a combustion gas evolves, an inert gas such as nitrogen may be passed at the beginning of the combustion.

According to the method of treating with the alcohol, the organic/inorganic composite material is dispersed in a solution prepared by adding a small amount of a cation component to a solvent having a large solubility in the surfactant, and the solid content is recovered after stirring. As the solvent, there can be used those having a large solubility in the surfactant, such as ethanol, methanol, acetone and the like. Examples of the substance containing the cation component to be added include hydrochloric acid, acetic acid, sodium chloride, potassium chloride and the like. The concentration of the cation added is preferably from 0.1 to 10 mol/l, and the amount of the organic/inorganic composite material dispersed is preferably from 0.5 to 50 g based on 100 cc of the ethanol solution. The stirring of the dispersion is preferably conducted at the temperature within the range from 25 to 100° C.

Incidentally, the grinding, sifting or molding may be conducted before or after the removal of the surfactant.

It is possible to control the resulting pore size according to the kind of the surfactant to be used, specifically length of the hydrophobic portion such as alkyl chain of the surfactant, by means of the above any method for production of the mesoporous material.

Accordingly, by using the mesoporous materials obtained by these methods, a cluster-included material having clusters with a desired size can be obtained.

(Cluster)

The cluster of the present invention means a group of atoms, and a granular cluster having a size within the range from 1 to 10 nm is referred to as a quantum dot while a thin linear cluster having a diameter within the range from 1 to 10 nm formed along the pore is referred to as a quantum wire. The quantum wire mostly has a length within the range from 10 to 100 nm. The term "quantum dot" used herein means a zero-dimensional electron system wherein charged materials such as electrons, excitons, etc. are contained in a three-dimensional microregion within the range from 1 to 10 nm, while the term "quantum wire" used herein means a one-dimensional electron system wherein charged materials are contained in a linear microregion within the range from 1 to 10 nm.

Generally considering the group of a lot of atoms, the fundamental property of the group is sometimes defined by the number or size of atoms. Particularly, a crystal having a periodicity in a bulk and an isolated group of atoms having a specific size differ largely in physical properties. Therefore, regarding the group of atoms of a so-called cluster range within the range from 1 to 10 nm, the number of atoms which are present on the surface of the group and that of atoms which are present in the group are almost the same, or the number of atoms on the surface is larger and, therefore, a specificity of the surface appears as macroscopic physical properties. Furthermore, the smaller the cluster size is, the larger the obtained quantum effect becomes. Accordingly, in the cluster region, it is possible to clearly confirm the quantum effect which has hitherto been unclear in the fine particle region (group of atoms having a size of about several tens to several hundreds nm) due to disturbance of heat energy.

Furthermore, by arranging clusters having a uniform size, it becomes possible to conduct a wide application design of the material, element, etc. utilizing the quantum effect.

Incidentally, the quantum effect refers to physical properties, which are different from those of the bulk solid, expressed when the number of atoms or molecules of the group is reduced to reach about $10^4$.

By using the mesoporous material having a pore size of 1.3 to 10 nm as a host for forming the clusters, granular clusters or thin clusters can be formed. Furthermore, by using a mesoporous material with pores having a constant pore size and distributed with regularity, clusters having constant cluster size and distributed with regularity can be obtained. Particularly, when the cluster is in the form of a granule comprising 10 to 100 atoms (quantum dot), the quantum effect due to zero-dimensional containment is satisfactorily exhibited. Furthermore, when the cluster is in the form of a thin line having a diameter of 1.3 to 10 nm (quantum wire), the quantum effect due to one-dimensional containment is satisfactorily exhibited.

(Material constituting cluster)

To the cluster-included material of the present invention, a magnetic function, an electron function and an optical function are imparted by means of the cluster formed in the pore.

Examples of a magnetic functional material for imparting the magnetic function to the cluster include metal, oxide and the like. As the material, preferred are those whose characteristics vary with the size of particles, particularly those having a single magnetic domain wherein the interior of one particle directs to the same magnetization direction when the particle size is within the region of not less than several hundreds nm. By using these materials as the magnetic recording material, the high-density recording characteristics can be improved. Particularly, in case that the silica mesoporous material is used as the host, the adjacent clusters are isolated by a silica skeleton. Therefore, there can be obtained a cluster-included material which causes little interface between adjacent recording points and is superior in information holding capability for a long period of time.

Examples of the material of the cluster having such a feature include Ni, Fe, Co, Mn, $Fe_3O_4$ and the like.

Examples of the electron functional material for imparting the electron function to the cluster include metal, semiconductor and the like. By forming the cluster of the metal, semiconductor, etc., thereby containing free electrons bearing the electron function in the space of the size smaller than their phase interference length of the effect peculiar to the quantum system (e.g. Aharanov-Bohm effect, universal functuation of conductivity, etc.) appears. Furthermore, when containing the free electrons in the space of the size smaller than the average free path of the electron, quantization of conductance due to formation of sub-band caused by micronizing arises. In such way, the property of the electron as a wave appears, and the property as a wave and the property as a particle interface each other to express a specific phenomenon as the cluster.

Therefore, by using this cluster-included material, it becomes possible to produce a single-gun device capable of controlling going in and out of one electron as a macroscopic physical amount. Since the containment region is within the range from several tens to several hundreds nm in a conventional semiconductor processing technique, it was necessary to cool to a low temperature to avoid disturbance due to heat energy. On the other hand, it becomes possible to make a fundamental structure of a high-speed low-dissipation power electronics device capable of operating at a normal temperature by means of a circuit design of several nm scale according to the present invention.

Examples of the optical functional material which imparts an optical function to the cluster include metal, semiconductor and the like. By containing an electron-hole pair (hereinafter referred to as an "exciton") in the semiconductor crystal in the zero-dimensional or one-dimensional small space, the increase in exciton binding energy and centralization of a oscillator strength are accelerated, thereby making it possible to extend a fundamental performance as a non-linear optical device and various optical mediums. According to the cluster-included material of the present invention, there can be solved a conventional problem that a semiconductor doped glass prepared by dispersing semiconductor clusters in a medium such as glass can not sufficiently exhibit the quantum effect. In the invention, the cluster size is suitably controlled so that the quantum effects exhibit efficiently.

(Method for synthesis of cluster-included material)
(Raw material for forming cluster)

Salts or complex salts of noble metals such as Pt, Pd, Rh, Ru, Ir, Au, Ag, etc. are used as the raw material of the cluster. Examples of the salt or complex salt of Pt include $H_2PtCl_6$, $Pt(NO_2)_2(NH_3)_2$, $[Pt(NH_3)_6]Cl_4$, $H_2Pt(OH)_6$, $PtCl_2(NH_3)_2$, $Pt(NH_3)_4Cl_2$, $Pt(NH_3)_4(OH)_2$, $Pt(NH_3)_4(OH)_4$, $K_2PtCl_4$, $PtCl_4$, $PtCl_2$ and the like. Furthermore, the raw material for the cluster may also be salts of transition metals, alkaline metals and alkaline earth metals, for example, chloride, nitrate, phosphate, carboxylate and the like. Alkoxides of these metals may also be used.

These cluster raw materials are converted into the above mentioned cluster material by the treatment mentioned below.

(Method for introduction of cluster raw material into mesoporous material)

Examples of the method of introducing a cluster raw material into pores of a mesoporous material include liquid phase method, solid phase method, vapor phase method and the like. In the liquid phase method, a salt or a complex salt of a cluster raw material is dissolved in a solvent such as water, ethanol, benzene, etc. and a mesoporous material is added, followed by mixing with stirring. Then, the mesoporous material is recovered and dried. In the solid phase method, a solid cluster raw material and a mesoporous material powder are mixed and then heated in a sealed vessel. Then, the excess cluster raw materials are removed by washing or the like. In the vapor phase method, those evolving a vapor, such as metal alkoxide, or a solid raw material which is liable to sublime are used and the vapor is brought into contact with a mesoporous material to introduce the raw material into the pores of the mesoporous material.

(Formation of cluster from cluster raw material)

For converting a cluster raw material introduced into pores of a mesoporous material into clusters, there can be used a method of treating with heat, light, γ-ray and the like.

The treating method to be used varies depending on the kind of the cluster raw material. In any method, a condition in which a salt or a complex salt is decomposed to form a metal is set. For example, in case of using $H_2PtCl_6$, the raw material is heated at the temperature of 200 to 600° C. in a current of air, nitrogen or hydrogen or under vacuum for 1 to 5 hours.

In case of reducing with light, a sample is kept in a vacuum transparent vessel and, after vacuum evacuation, light irradiation is conducted with cooling the sample. A high-pressure mercury lamp can be used. The irradiation time is preferably from 10 minutes to 3 hours. At that time, it is preferred to conduct light irradiation with introducing alcohol vapor such as 2-propanol, water vapor, $CO_2$ gas, etc. in a vacuum vessel containing a sample.

In case of using γ-ray, a sample is kept in a vacuum transparent vessel and, after vacuum evacuation, γ-ray irradiation is conducted. The irradiation time is preferably from 1 hour to 100 hours. Incidentally, it is preferred to introduce CO before γ-ray irradiation.

(Selective Production of quantum dot and quantum wire in cluster-included material)

Fundamentally, when using a mesoporous material having one-dimensional tunnel-like pores, thin clusters, that is, a quantum wire clusters are formed. On the other hand, when using those wherein box-shaped pores are three-dimensionally bonded, quantum dot clusters are formed. When the amount of the cluster material is reduced, even in the mesoporous material having one-dimensional tunnel-like pores, the clusters become a dot-like form, not a linear form, thereby making it possible to form quantum dot structure.

In the present invention, since the clusters are formed in the pores of the mesoporous material having a pore size of 1.3 to 10 nm, cluster expressing an intended quantum effect are formed.

EXAMPLES

The present invention will now be illustrated by means of the following Examples, which should not be construed as a limitation upon the scope of the invention.

Example 1

Production 1 of mesoporous material (FSM/8, 10, 12, 14, 16)

Powdered sodium silicate ($SiO_2/Na_2O=2.00$) manufactured by Nippon Chemical Industrial Co., Ltd. was calcined in air at 700° C. for 6 hours to crystallize it to form sodium disilicate ($\delta-Na_2Si_2O_5$). This crystal (50 g) was dispersed in water (500 cc), followed by stirring for 3 hours. Then, the solid content was recovered by filtration to obtain a kanemite crystal. Without drying this kanemite, kanemite (50 g in dry weight) was dispersed in an aqueous solution (1000 ml) of 0.1 M hexadecyltrimethylammonium chloride $[C_{16}H_{33}N(CH_3)_3Cl]$, followed by heating with stirring at 70° C. for 3 hours. The pH of the dispersion at the beginning of heating was 12.3. Then, 2N-hydrochloric acid was added with heating at 70° C. under stirring and the pH of the dispersion was decreased to 8.5. The dispersion was heated at 70° C. for additional 3 hours and then air-cooled to room temperature. The solid product was once filtered and dispersed in deionized water (1000 ml), followed by stirring. After repeating this filtration/ dispersion with stirring 5 times, the resultant was dried at 60° C. for 24 hours. This sample was heated in a nitrogen gas at 450° C. for 3 hours and then calcined in air at 550° C. for 6 hours to obtain a mesoporous material (FSM/16).

According to the same operation as that described above except for using four kinds of alkyltrimethylammonium $[C_nH_{2n+1}N(CH_3)_3]$ chloride (n=14) or bromides (n=8, 10, 12) having a different length (n) of the $[CnH_2n+_1]$ chain in place of hexadecyltrimethylammonium chloride, four kinds of mesoporous materials were produced. A numeral (n) showing the length of the alkyl chain of the alkyltrimethylammonium used was attached to the respective mesoporous materials, which were marked with FSM/8, FSM/10, FSM/12 and FSM/14, respectively.

Example 2
Production of mesoporous material (FSM/M05, 10, 20)

According to the same condition as that described in Example 1 except for adding mesitylene [$C_6H_3(CH_3)_3$] in addition to hexadecyltrimethylammonium chloride (0.1 mol) in the method for production of the mesoporous material of Example 1, mesoporous materials were produced. The mesoporous materials were produced by varying the amount of mesitylene added (0.05, 0.1 and 0.2 mol). They were marked with FSM/M05, FSM/M10 and FSM/M20, respectively.

Example 3
Production of mesoporous material (FSM/16P, FSM/16D)

$\delta$-$Na_2Si_2O_5$ (50 g) obtained by calcining amorphous sodium silicate (manufactured by Nippon Chemical Industrial Co., Ltd.: powdered sodium silicate, $SiO_2/Na_2$=2.00) (50 g) or powdered sodium silicate in air at 700° C. for 6 hours was dispersed in an aqueous solution (1000 ml) of 0.1 M hexadecyltrimethylammonium chloride, followed by heating with stirring at 70° C. for 3 hours. Then, the pH of the dispersion was adjusted to 8.5 by adding dropwise an aqueous 2N-hydrochloric acid solution. The dispersion was heated at 70° C. for additional 3 hours and then cooled to room temperature. The solid product was filtered and dispersed in deionized water (1000 ml), followed by stirring for about 5 minutes and further filtration. After repeating this filtration and dispersion operation 5 times, the product was dried and calcined at 550° C. to obtain two kinds of powder samples. These samples were marked with FSM/16P and FSM/16D, respectively.

Example 4
X-ray diffraction of mesoporous material

The powder X-ray diffraction pattern of these synthesized mesoporous materials was measured, respectively. The X-ray diffraction was conducted by scanning at 2 degrees (2θ)/minute using a Rigaku RAD-B device and using CuK α as a radiation source. A slit width is one degree-0.3 mm-one degree. The results are shown in FIG. 1 and FIG. 2.

Figure 1:
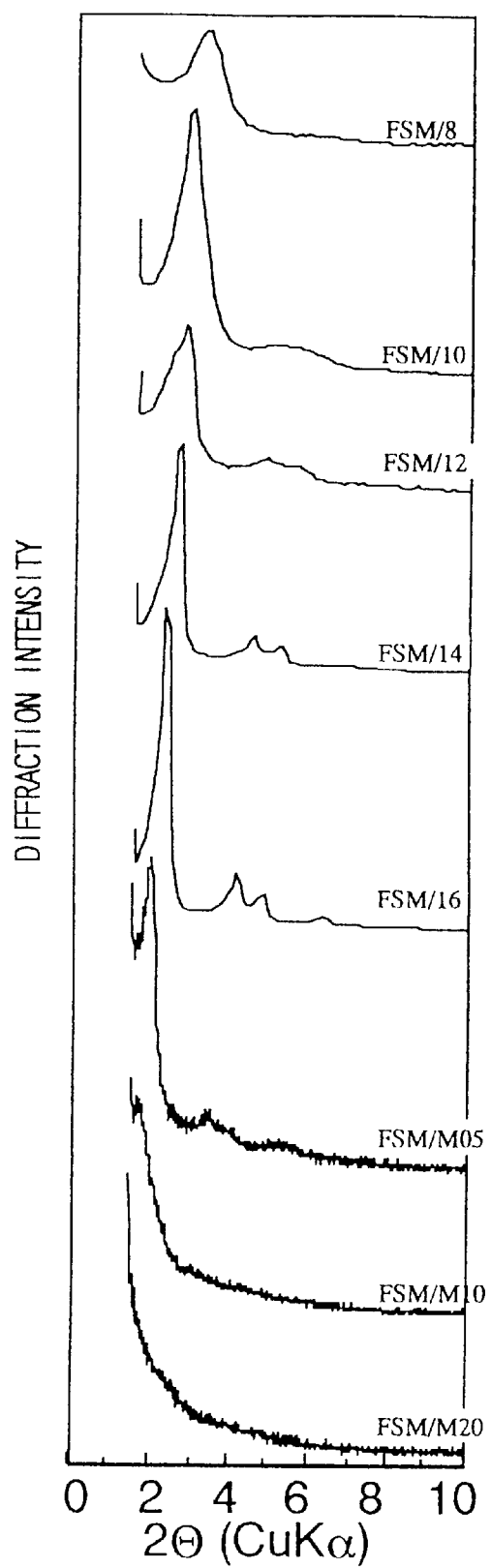
FIG. 1 is a diagram showing an X-ray diffraction pattern of the mesoporous materials obtained in Examples 1 and 2.
Figure 2:
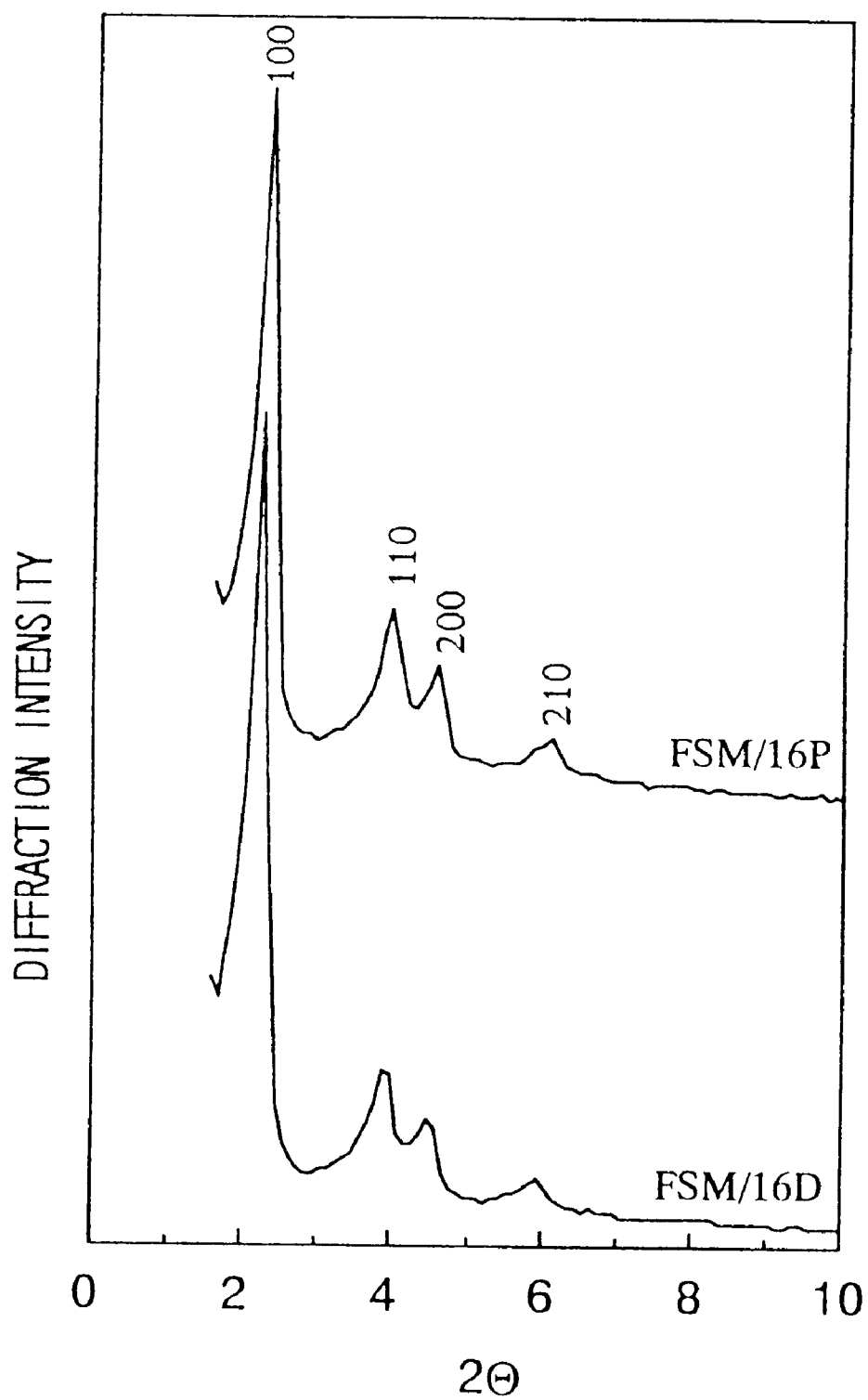
FIG. 2 is a diagram showing an X-ray diffraction pattern of the mesoporous material obtained in Example 3.

As is apparent from the X-ray diffraction pattern of FIG. 1 and FIG. 2, several peaks were observed at the diffraction angle (2θ) of not more than 10 degrees in these mesoporous materials. A value obtained by converting the diffraction angle of the peak into ad-value is shown in FIG. 3. With respect to FSM/12, FSM/14, FSM/16, FSM/M05, FSM/16P and FSM/16D, 3 to 4 peaks having a d-value of not less than 1 nm were observed. These peaks were indexed to a hexagonal structure. On the other hand, with respect to FSM/8, ESM/10 and FSM/M10, 1 to 2 peaks having a d-value of not less than 1 nm were observed. With respect to FSM/M20, a clear peak having a d-value of not less than 1 nm was not observed. As is apparent from the results of these X-ray diffraction patterns, these mesoporous materials excluding FSM/M20 have a regular periodic structure.

Example 5
Pore size distribution curve of mesoporous material

Figure 4:
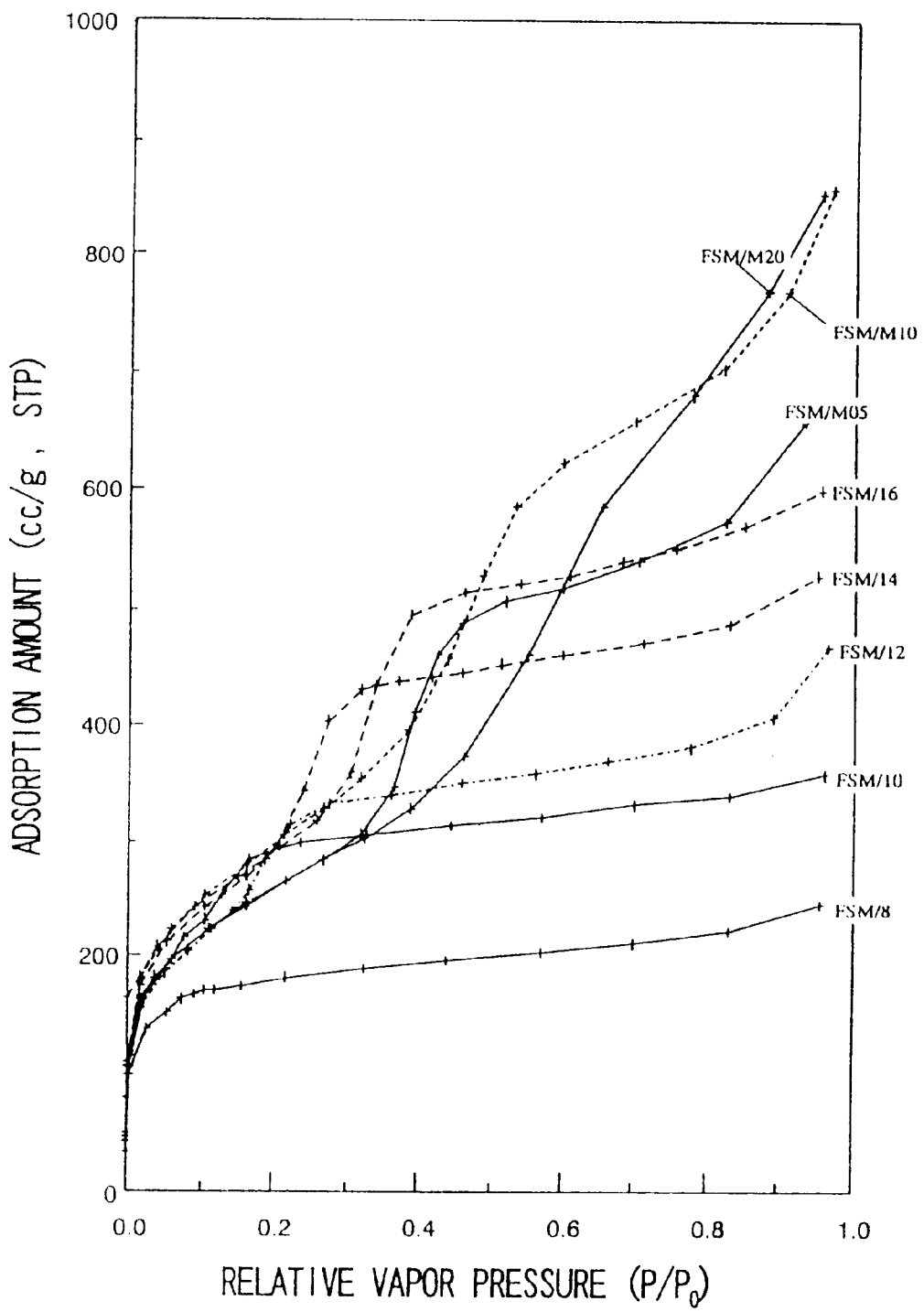
FIG. 4 is a graph showing a nitrogen adsorption isotherm of the mesoporous materials obtained in Examples 1 and 2.
Figure 5:
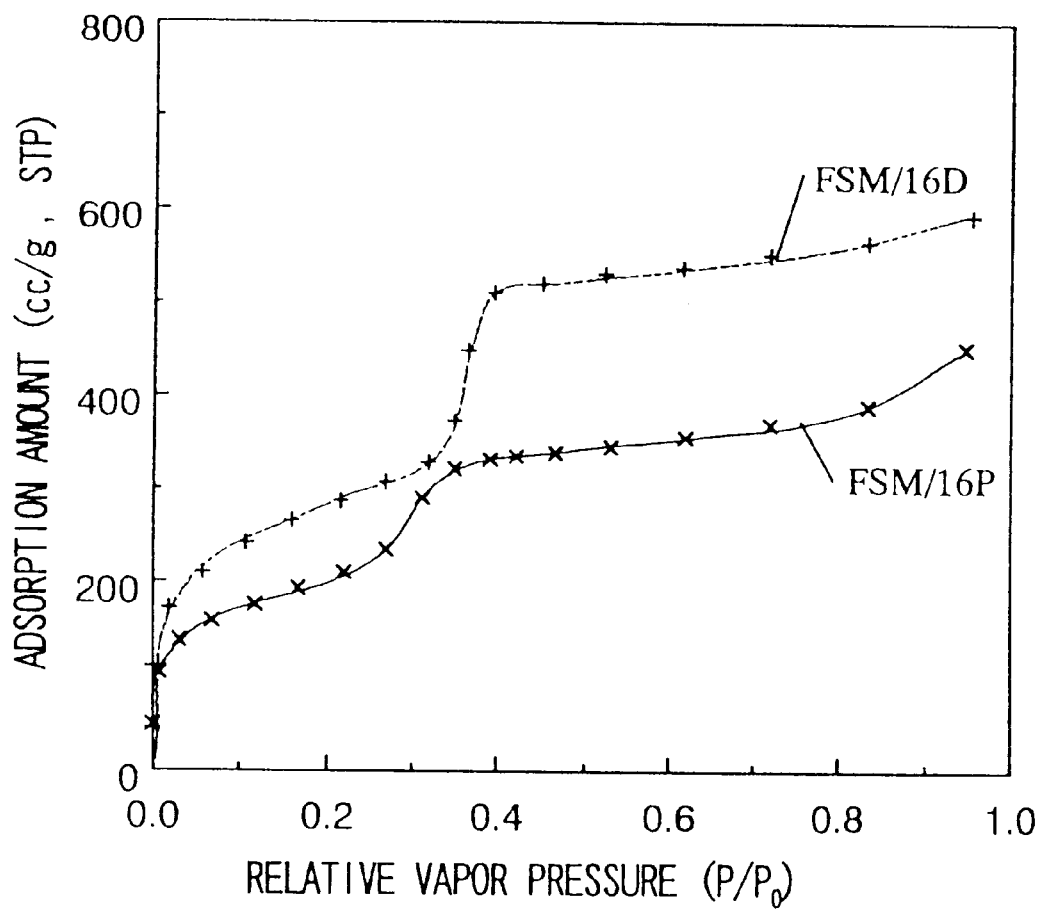
FIG. 5 is a graph showing a nitrogen adsorption isotherm f the mesoporous material obtained in Example 3.

The pore size distribution curve of these mesoporous material was determined from a nitrogen adsorption isotherm. The nitrogen adsorption isotherm was determined as follows. A device equipped with a glass vacuum line, a pressure sensor (MKS, Baratron 127AA, range: 1000 mmHg) and two control valves (MKS, 248A), the pressure sensor and control valves being connected to the glass vacuum line, is used, in which introduction of a nitrogen gas into the vacuum line and a sample tube are automatically conducted. The mesoporous material sample (about 40 mg) was charged in a glass sample tube which was connected to the vacuum line. The sample was vacuum-dried at room temperature for about 2 hours. The ultimate pressure was $10^{-4}$ mmHg. The sample tube was immersed in liquid nitrogen and a nitrogen gas of a predetermined pressure was introduced into the vacuum line portion. After the pressure became stable, a control valve of the sample tube was opened and the equilibrium pressure was recorded after the pressure became constant. The same operations were repeated at 16 to 18 points at the equilibrium pressure within the range from 0 to 760 mmHg. The time required to reach the equilibrium varies with the pressure, but was within the range from 20 to 60 minutes. By plotting this equilibrium pressure and the adsorption amount determined by a change in pressure, a nitrogen adsorption isotherm of the above mesoporous material was made. The results are shown in FIG. 4 and FIG. 5.

Figure 7:
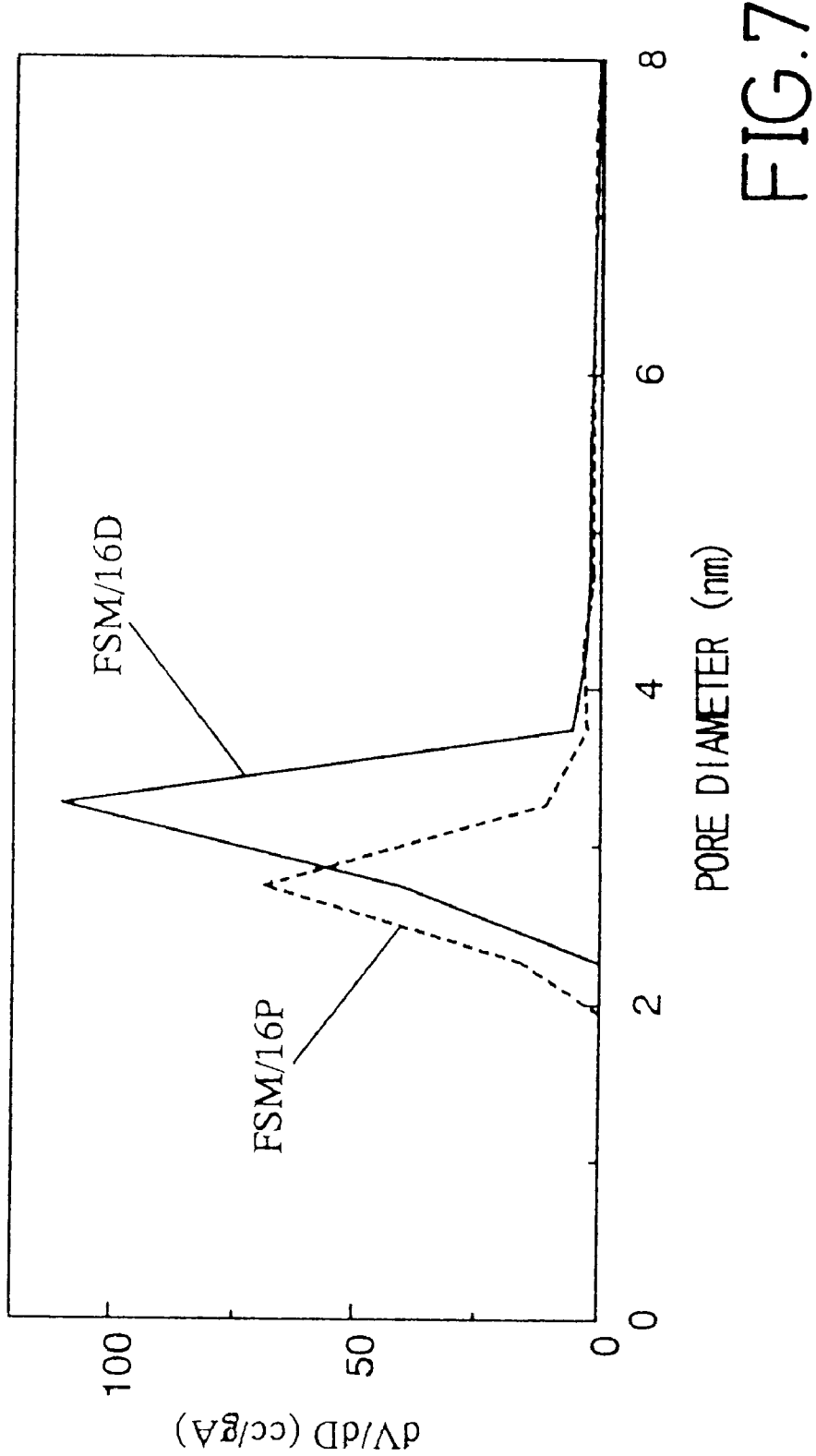
FIG. 7 is a graph showing a pore size distribution curve of the mesoporous material obtained in Example 3.

The pore size distribution curve was determined from this nitrogen adsorption isotherm according to the Cranston-Inklay method. The results are shown in FIG. 6 and FIG. 7. The pore diameter which shows a maximum peak in the pore size distribution curve (referred to as a "mean pore diameter"), the whole pore volume and the ratio of the pore volume included in the pore size range from −40% to +40% of the mean pore diameter with respect to the whole pore volume are shown in FIG. 8. Regarding these mesoporous materials, the mean pore diameter is within the range from 1 to 10 nm and not less than 60% of the whole pore volume is included within the pore size range from −40% to +40% of the mean pore diameter which shows the maximum peak in the pore size distribution curve.

Figure 9:
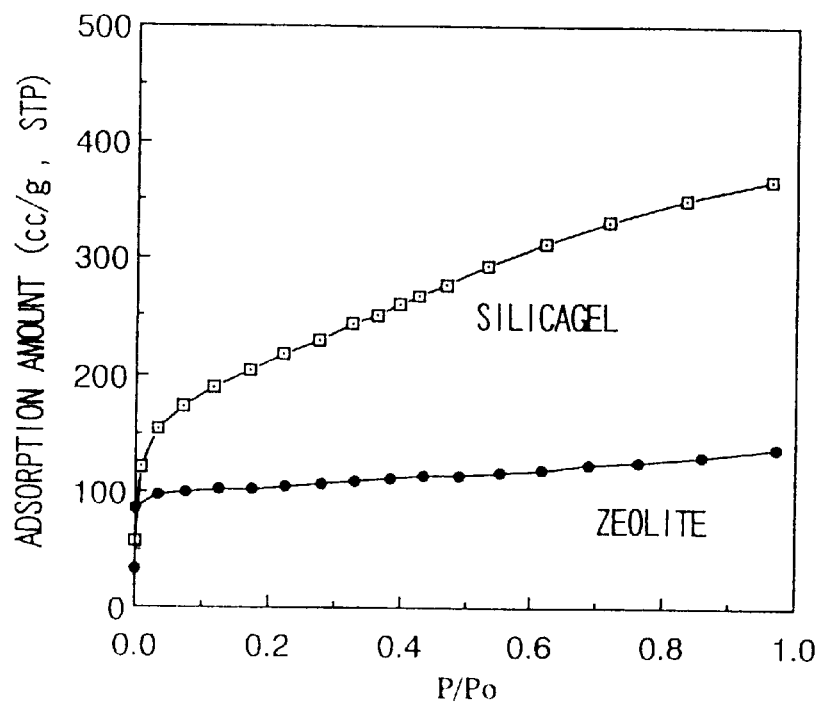
FIG. 9 is a graph showing a nitrogen adsorption isotherm of silica gel and zeolite.
Figure 10:
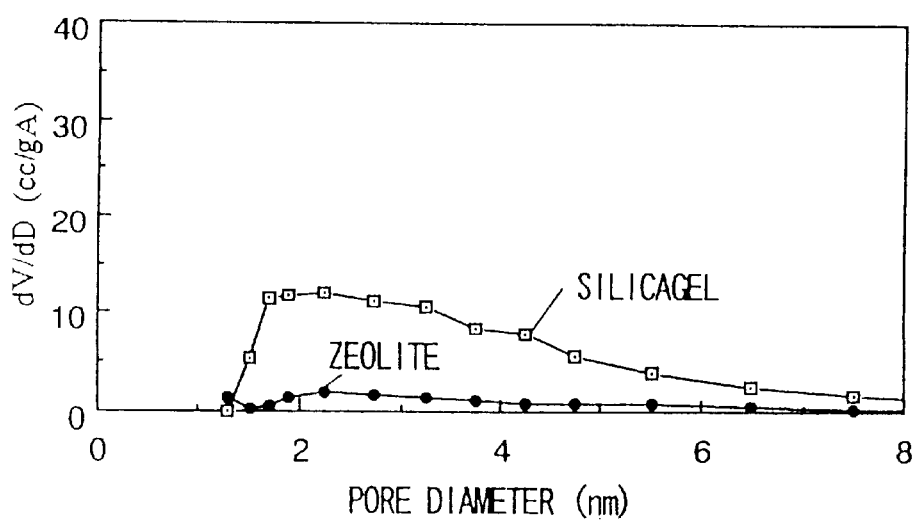
FIG. 10 is a graph showing a pore size distribution curve of silica gel and zeolite.

On the other hand, the nitrogen adsorption isotherm and pore distribution curve of silica gel (commercially available A type) and zeolite (ZSM-5) are shown in FIG. 9 and FIG. 10, for comparison. The mean pore diameter, whole pore volume and ±40% volume ratio are shown in FIG. 8. Regarding silica gel, the pore diameter is within the range from 1.4 to 10 nm and the mean pore diameter is 2.3 nm, but the ±40% volume ratio was less than 60% and the pore size distribution was broad. Regarding zeolite, the ±40% volume ratio was not less than 60% but the mean pore diameter was 0.5 nm and was too small.

Example 6
Production 1 of mesoporous material from alkoxysilane

To tetramethoxysilane (TMOS) (15. 2 g) were added water (3.6 g) and 2N-hydrochloric acid (about 0.1 g), followed by stirring at room temperature for about 1 hour. To the solution was added dodecyltrimethylammonium bromide (DDTA) (7.71 g) or a mixture of DDTA (7.71 g) and water (3.6 g), followed by vigorous stirring for several minutes. As a result, the solution showed viscosity. The solution was allowed to stand in a sealed vessel at room temperature for 2 to 3 days. As a result, a transparent uniform solid was obtained. In this case, a molar ratio of $H_2O$ to Si in the raw material mixture was 2 or 4. Two kinds of these solids having a different molar ratio of $H_2O$ to Si were dried and calcined in air at 550° C. for 6 hours to remove the organic component. The resulting solid was ground and the particle size was adjusted to 10 to 150 μm using a screen.

Figures 11, 12:
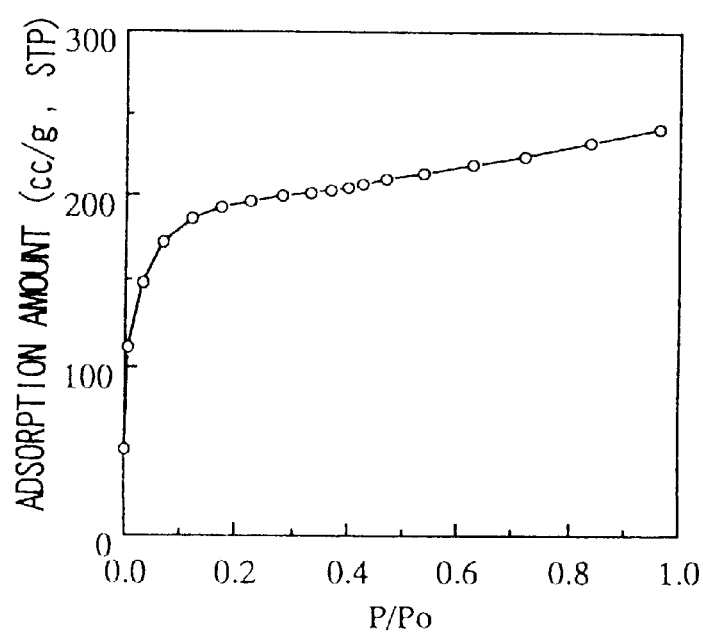
FIG. 11 is a chart showing a density and a specific surface area of the mesoporous material obtained in Example 6.
FIG. 12 is a graph showing a nitrogen adsorption isotherm of the mesoporous material obtained in Example 6.
Figure 13:
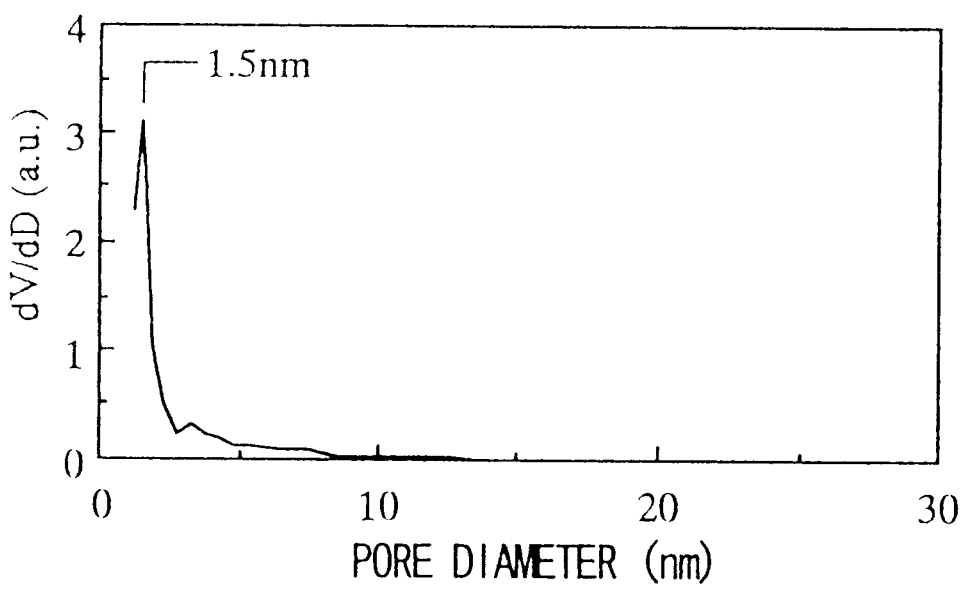
FIG. 13 is a graph showing a pore size distribution curve of the mesoporous material obtained in Example 6.
Figure 14:
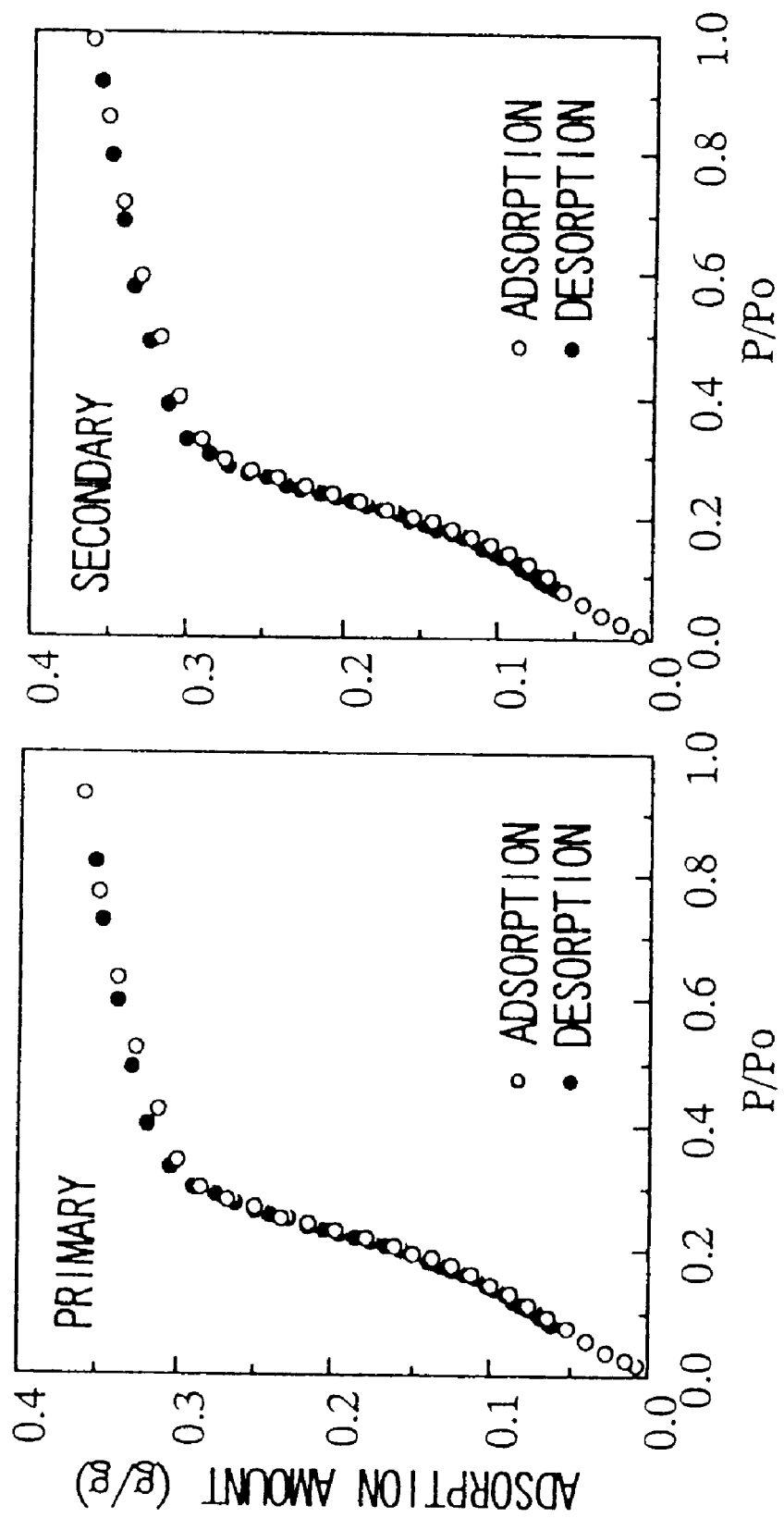
FIG. 14($a$) is a graph showing a primary water vapor adsorption isotherm of the mesoporous material of Example 6.

The results obtained by measuring the density and specific surface area of the sample produced by the present invention are shown in FIG. 11. Incidentally, the density was determined by measuring the weight and volume using a weight meter and a measuring cylinder. The specific surface area was determined by the BET one-point method using an automatic specific surface area measuring device manufactured by Okura Riken Co., Ltd. As is apparent from the results, the sample produced by the present invention shows high density.

For comparison, according to the same operation as that described in this Example except for changing the amount of water added to adjust the molar ratio of $H_2O$ to Si to 12, 32, comparative samples were produced, and the results obtained by measuring the density and specific surface area according to the same manner as that described above are also shown in FIG. 11. As is apparent from these results, when the molar ratio of $H_2O$ to Si exceeds 10, the density was also decreased and the specific surface area was also decreased.

Example 7

The nitrogen adsorption isotherm, pore size distribution curve, water vapor adsorption isotherm and powder X-ray diffraction of the sample prepared under the condition of the molar ratio of $H_2O$ to Si is 2 in Example 6 were masured or calculated, and are shown in FIG. 12, FIG. 13, FIG. 14 and FIG. 15. The nitrogen adsorption isotherm was measured at the liquid nitrogen temperature by means of the volumetrical method. The pore size distribution curve was calculated from the nitrogen adsorption isotherm using the Cranston-Inklay method. The water vapor adsorption isotherm was measured at 25° C. by the volumetrical method using BELSORP 18 manufactured by Nippon Bell Co., Ltd. The X-ray diffraction was conducted by scanning at 2 degrees ($2\theta$)/minute using a Rigaku RAD-B device and using CuK α as a radiation source. A slit width is one degree-0.3 mm-one degree. In the nitrogen adsorption isotherm, high adsorptivity was shown even at low relative vapor pressure ($P/P_0$) and the adsorption amount was 200 cc/g when P/Po is 0.2 in case of the nitrogen gas (standard condition, STP). The pore volume of this sample was calculated from this value, and it was 0.31 cc/g (see FIG. 12). As is apparent from the pore size distribution curve, the mean pore diameter of this sample is 1.5 nm (see FIG. 13). The water vapor adsorption line showed characteristics that the adsorption amount varies largely when $P/P_0$ is within the range from 0 to 0.3. The isotherm at the adsorption branch and that at the desorption branch agreeed nearly and showed no hysteresis (see FIG. 14(a) and FIG. 14(b)). As is apparent from the fact that, even if the second water vapor adsorption isotherm (secondary) (see FIG. 14(b)) was measured by using the same sample, the same isotherm as the first (primary) isotherm was obtained, no structural change due to water vapor adsorption was observed.

In the powder X-ray diffraction pattern (FIG. 15)of this sample, a clear diffraction peak was not observed at the diffraction angle within the range from 1 to 60 degrees. Accordingly, it is shown that this mesoporous material has no regular periodic structure.

Example 8

Production 2 of mesoporous material from alkoxysilane

To tetramethoxysilane (TMOS) (15. 2 g) were added water (3.6 g) and 2N-hydrochloric acid (about 0.1 g), followed by stirring at room temperature for about 1 hour. To the solution was added decyltrimethylammonium bromide (DTA) (7.01 g) or octyltrimethylammonium bromide (OTA) (6.31 g), followed by vigorous stirring for several minutes. As a result, the solution showed viscosity. The solution was allowed to stand at room temperature in a sealed vessel for 2 to 3 days. As a result, the solution was converted into a transparent uniform solid. In both cases, the molar ratio of $H_2O$ to Si was 2. These solids were dried and then calcined in air at 550° C. for 6 hours to remove the organic component. The resulting solid was ground and the particle size was adjusted to 100 to 150 µm using a screen.

Figures 15, 16:
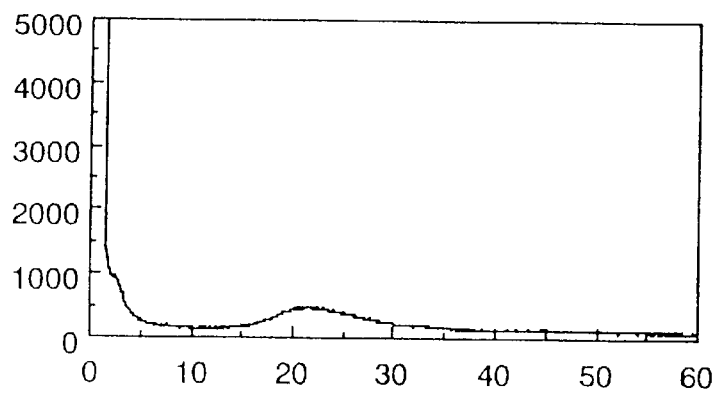
FIG. 15 shows a spectrum of powder X-ray diffraction of the mesoporous material obtained in Example 6.
FIG. 16 is a chart showing a density and a specific surface area of the mesoporous material obtained in Example 8.

The results obtained by measuring the density and specific surface area of these samples are shown in FIG. 16. Incidentally, the density was determined by measuring the weight and volume using a weight meter and a measuring cylinder. The specific surface area was determined by the BET one-point method using an automatic specific surface area measuring device manufactured by Okura Riken Co., Ltd. All samples show high density.

Example 9

Production of cluster-included material by means of light irradiation

FSM/16 (Si/Al=320, 950 m²/g, pore size: 2.7 nm) (1.5 g) synthesized in accordance with Example 1 was suspended in distilled water (40 ml), to which was added dropwise an aqueous solution prepared by dissolving hydrogen hexachloroplatinate hexahydrate $H_2PtCl_6 \cdot 6H_2O$ (manufactured by Wako Pure Chemical Industries Co., Ltd., powder) (233 m) in distilled water (30 ml). The mixture was stirred in a schrenk tube under a nitrogen atmosphere for 12 hours. The product obtained by vacuum drying at room temperature was taken as a starting material of the cluster-included material.

The above substance was sufficiently ground using an agate mortar and the ground substance (about 200 mg) was put in a quartz cell. After subjecting to an evacuation treatment at room temperature under vacuum of $10^{-2}$ to $10^{-3}$ Pa for 1 hour, saturated vapor (6.7 kPa at room temperature) of 2-propanol (manufactured by Wako Pure Chemical Industries Co., Ltd., 99.5% guaranteed) was introduced and light irradiation was conducted under sufficient cooling of the sample using a high-pressure mercury lamp (manufactured by UAHIO Denki Co., Ltd., UM-102, λ=254 nm) to obtain a cluster-included material. The color of the substance was changed from pale yellow to pale gray by light irradiation.

The cluster-included material (30 mg) obtained by light irradiation was pressure-molded (400 kg/cm², 5 seconds) using a tablet molding device (manufactured by Shimazu Corporation,diameter: 20 mm) to obtain a thin circular sample for measuring transmission IR spectrum.

The transmission IR spectrum was measured by using FT-IR8100M single beam FT-IR (manufactured by Shimazu Corporation, resolving power: 2 cm$^{-1}$). The previously prepared IR disc sample was introduced in an In-situpyrex glass IR cell (hereinafter referred to as an "IR cell") and a predetermined treatment was conducted, and the IR spectrum was measured. The measurement was conducted 100 times and IR signals were averaged to obtain an IR spectrum.

A normal measurement was conducted as follows. That is, the vacuum evacuation was conducted at room temperature for 1 hour and an IR cell was set in a vapor FT-IR device. After measuring a background first, a sample holder was lowered on a transmission axis of IR beam and measurement was conducted. In case of the treatment with heating, the sample holder was raised to the center position of the heating region by a ribbon heater, that is, the point position of a thermocouple to be heated at a controlled temperature, and then the measurement was conducted at room temperature. In case of treating in a gas atmosphere, the device was connected to a vacuum line through an upper common sliding joint and a gas was introduced, and then the treatment was conducted at a predetermined temperature for a predetermined time.

Figure 17:
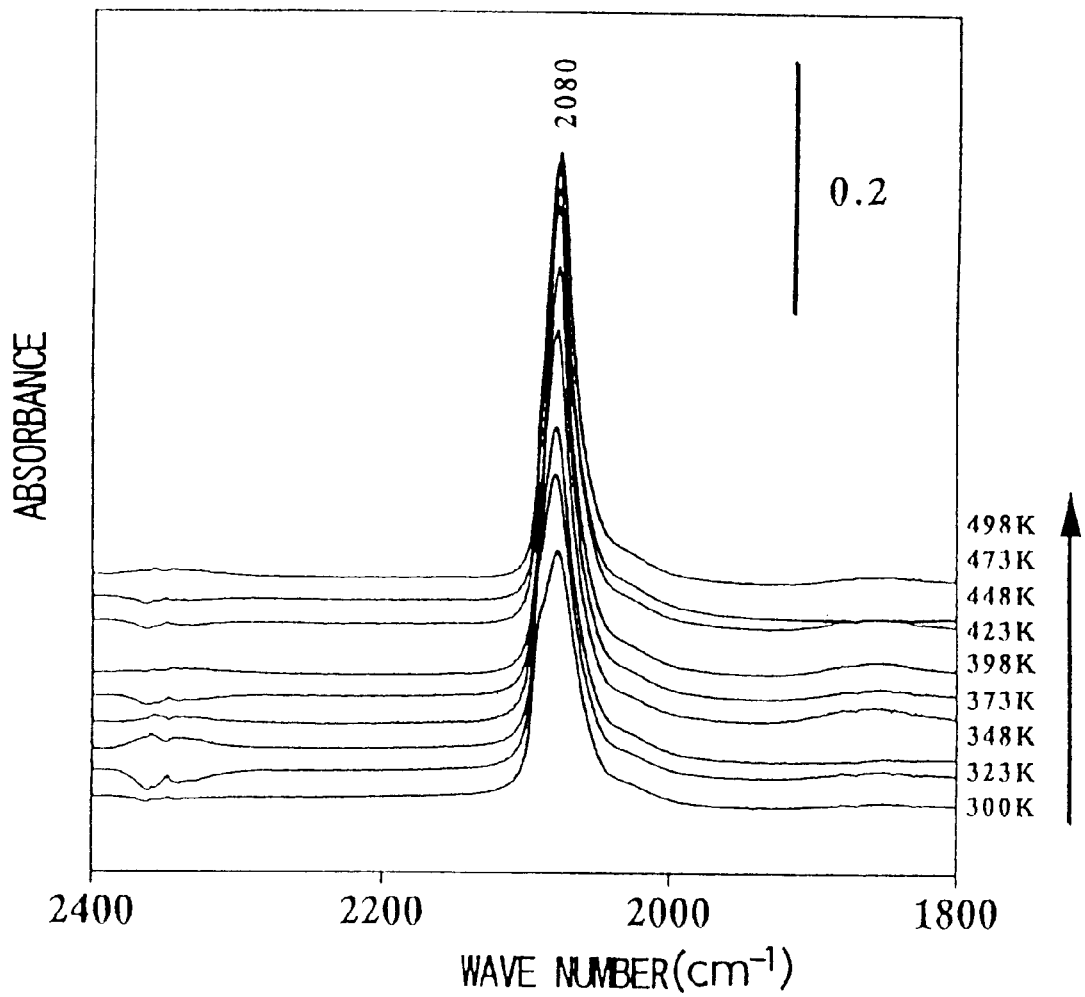
FIG. 17 is a graph showing carbonyl absorption of the cluster-included material obtained in Example 9.

An adsorbed substance on the metal surface was eliminated by subjecting the sample obtained by light irradiation to an evacuation treatment in the cell at 200° C. for 30 minutes, and CO 13.3 kPa was introduced. As a result, as shown in FIG. 17, absorption of CO (carbonyl) coordinated to platinum in a low valency state was observed only at 2080 $cm^{-1}$. By heating in a CO atmosphere at 50° C. and 100° C. for 30 minutes, respectively, the intensity of this absorption increased.

As is apparent from the absorption wave number of this adsorbed CO, the formed Pt is different from a normal bulk Pt metal.

Example 10

Production of cluster-included material by means of γ-ray irradiation

According to the same manner as that described in Example 9, the same mesoporous material (FSM/16) as that used in Example 9 was used as a starting material of a cluster-included material.

The above substance was sufficiently ground using an agate mortar and the ground substance (about 200 mg) was put in a quartz cell. After subjecting to an evacuation treatment at room temperature under vacuum of $10^{-2}$ to $10^{-3}$ Pa for 1 hour, water vapor (4 kPa), vapor (6.7 kPa) of 2-propanol (manufactured by Wako Pure Chemical Industries Co., Ltd., 99.5% guaranteed) and then CO (manufactured by Takachiho Industrial Co., Ltd., 13.3 kPa) were introduced and γ-ray (radiation source: cobalt 60, 14.0 kGy) irradiation was conducted for 72 hours to obtain a cluster-included material. The color of the substance was changed from pale yellow to pale gray by γ-ray irradiation.

According to the same manner as that described in Example 9, a sample for measuring a transmission IR spectrum was obtained from the cluster-included material obtained by γ-ray irradiation and, furthermore, the IR spectrum of this sample was obtained.

Figure 18:
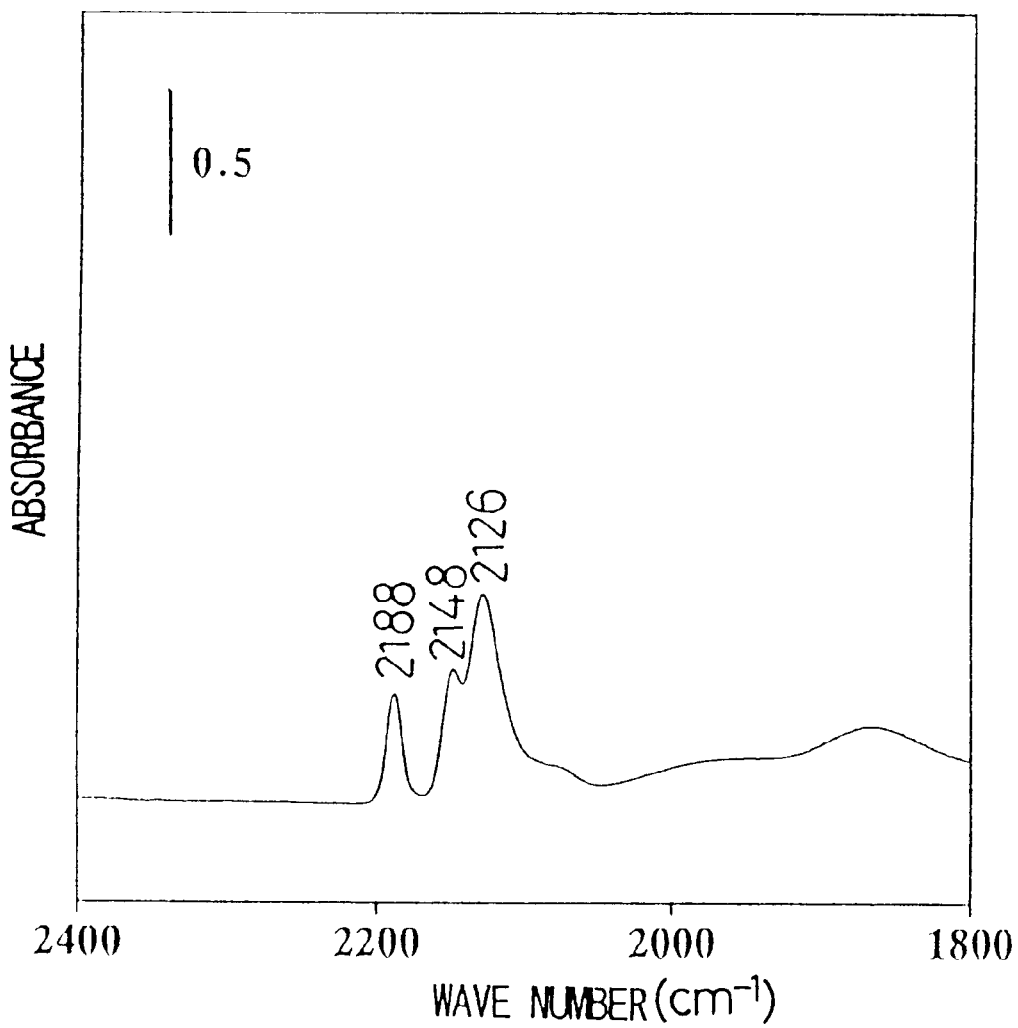
FIG. 18 shows infrared absorption spectrum showing carbonyl absorption of the cluster-included material obtained in Example 10.

An adsorbed substance on the metal surface was eliminated by subjecting the sample to an evacuation treatment in the cell at 200° C. for 30 minutes, and CO (13.3 kPa) was introduced. As a result, as shown in FIG. 18, CO absorption of [$Pt(CO)Cl_3$] was observed at 2126 $cm^{-1}$ and CO absorption of cis-$Pt(CO)_2Cl_2$ was observed at 2118 $cm^{-1}$ and 2148 $cm^{-1}$, respectively, said absorption being attributed to symmetric or asymmetric expansion oscillation.

As is apparent from the results, the formed Pt is different from a normal bulk Pt metal.

Figure 19:
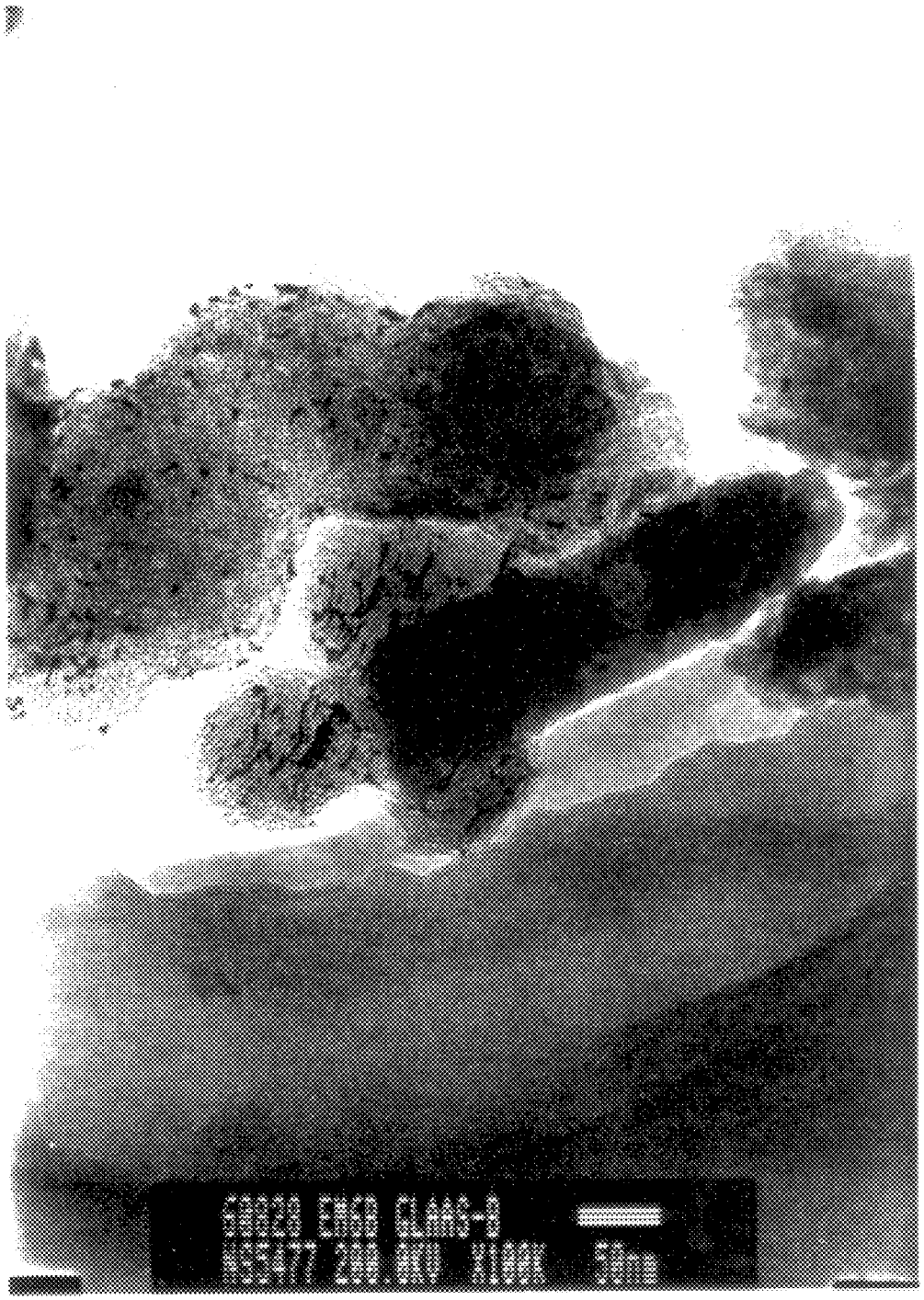
FIG. 19 is a transmission electron micrograph of the cluster-included material obtained in Example 10 (magnification: ×100,000).
Figure 20:
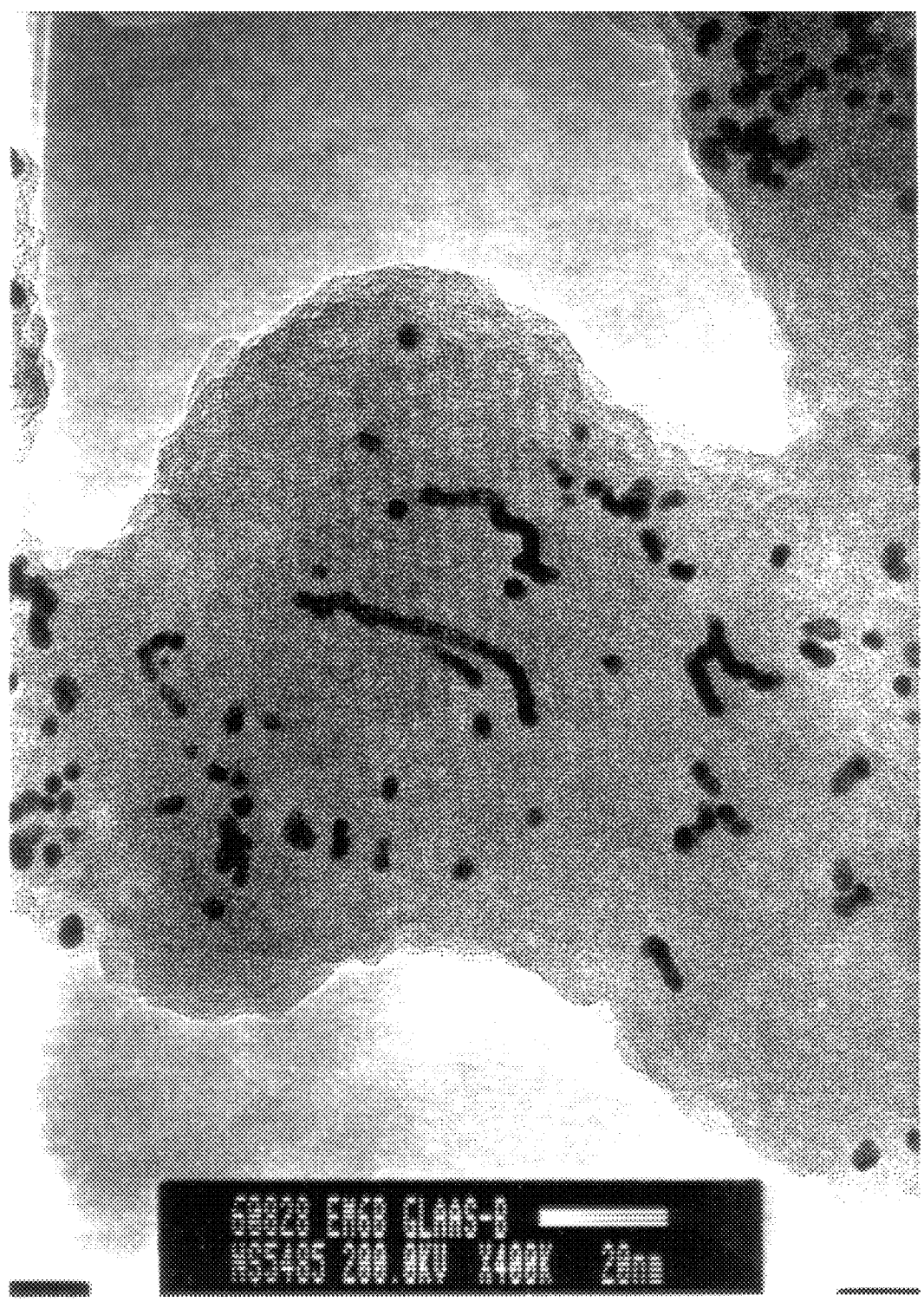
FIG. 20 is a transmission electron micrograph of the cluster-included material obtained in Example 10 (magnification: ×400,000).
Figure 21:
FIG. 21 is a transmission electron micrograph of the cluster-included material obtained in Example 10 (magnification: ×200,000).

Transmission electron micrographs of the cluster-included material obtained in Example 10 are shown in FIG. 19 to FIG. 21. These electron micrographs are taken about the same sample. In these electron micrographs, the dark black portion indicates a platinum cluster and the gray-colored portion as the background of the dark black portion indicates a mesoporous material including the platinum cluster.

The white dot-like or white thin linear portion in the mesoporous material background indicates a pore in the mesoporous material. These white portions show that the pores are one-dimensionally formed in the tunnel form. It can be confirmed that these pores are regularly arranged. As is apparent from the fact that these white portions are observed over the whole gray-colored portion, the pores are formed over the whole mesoporous material. The pore size of this pore is about 3 nm.

It is observed that the dark black portion linearly extends along the white thin linear portion in the background having the white thin linear portion, and is in the same dot form as that of the white dot portion in the background having the white dot portion. Furthermore, the size of these black portions is about 3 nm. Accordingly, it is considered that almost all of these dark black portions are formed linearly having a diameter of about 3 nm in the pore.

Example 11

Function evaluation of cluster-included material

Figure 22A:
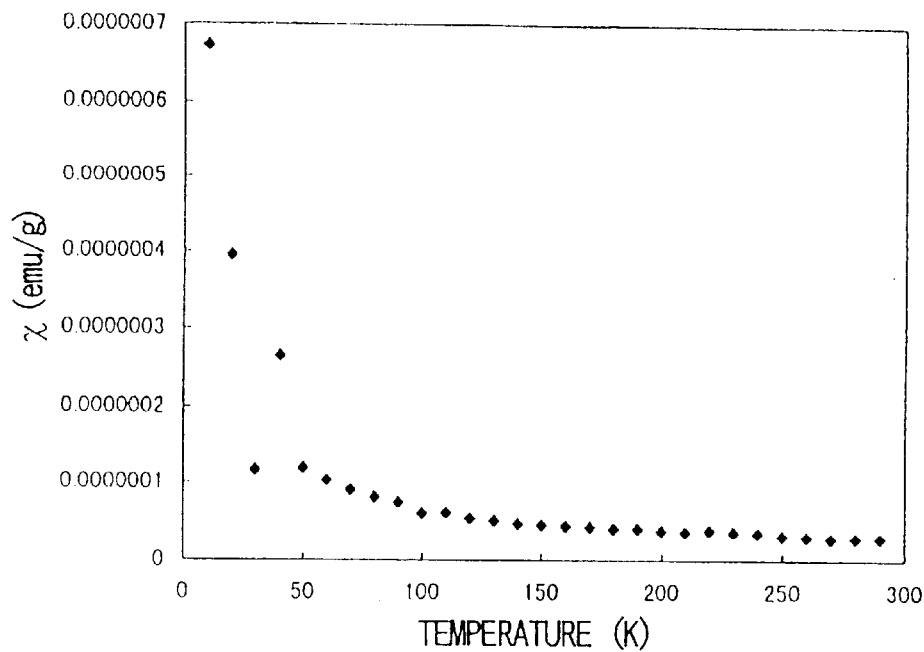
FIG. 22($a$) and FIG. 22($b$) respectively show magnetic characteristics of the cluster-included material of Example 10.
Figure 22B:
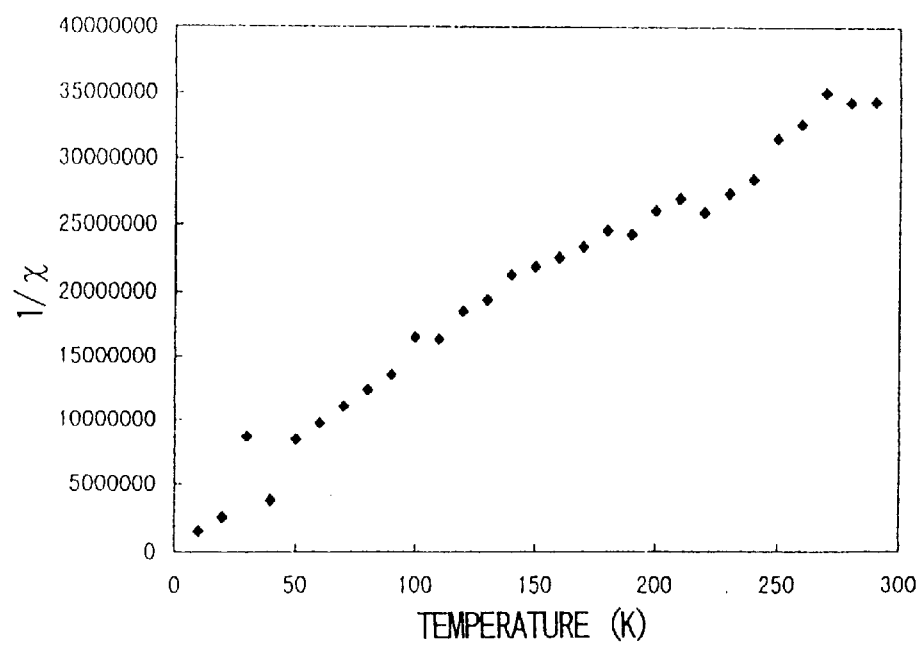
Figure 23A:
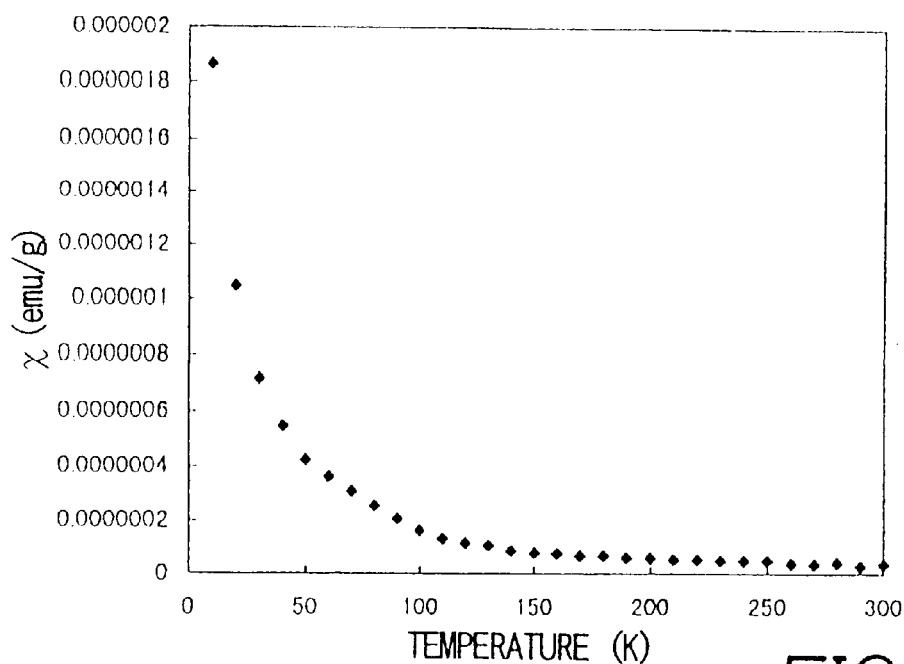
FIG. 23($a$) and FIG. 23($b$) respectively show magnetic characteristics of the cluster-included material of Example 10.
Figure 23B:
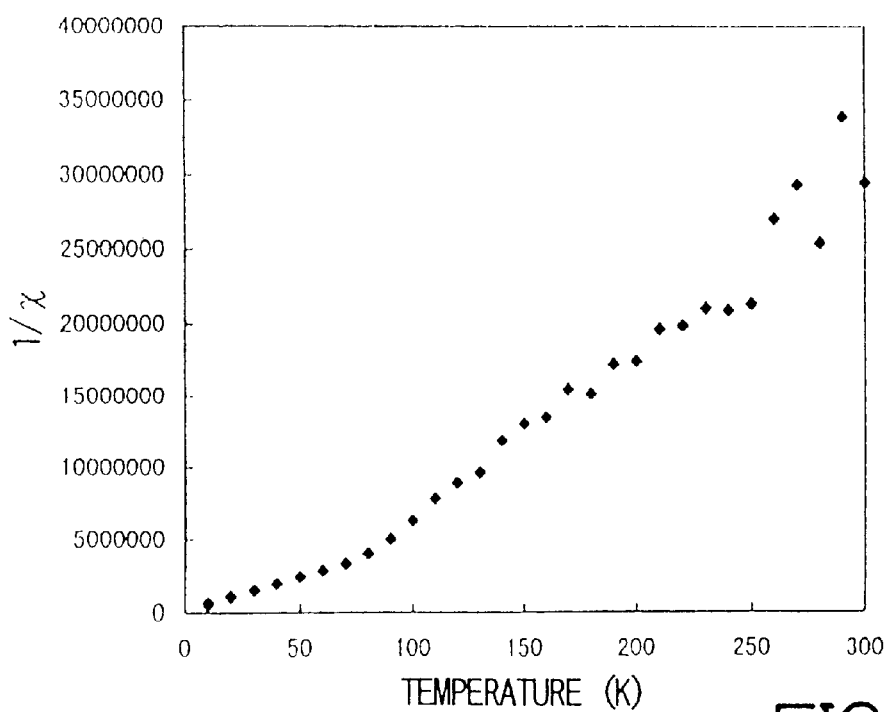

According to Example 9 and Example 10, novel magnetic materials obtained by containing platinum into the pores of the mesoporous material were provided. Magnetic characteristics of the mesoporous materials containing platinum clusters prepared in Examle 9 and Example 10 are shown in FIG. 22 and FIG. 23, respectively. For example, the vertical axis represents a magnetic susceptibility (X) per 1 g of a mesoporous material containing platinum clusters or a reciprocal thereof. In these cluster-included materials, different existence forms of platinum, that is, a granular platinum cluster (quantum dot) and a thin line platinum cluster (quantum wire) were observed, respectively. In the former, the content of platinum is 1.7% by weight and, in the latter, it is 10.0% by weight,respectively.

First, the case of the granular platinum cluster having a particle size of about 2 nm will be described. As the index of the magnetic characteristics, an absolute value of a magnetic moment per 1 g of platinum is exemplified first. The magnetic susceptibility (X) of bulk platinum as a standard is about $0.983\times10^{-6}$ emu/g at a normal temperature. The magnetic susceptibility per 1 g of a platinum cluster in the mesoporous material, converted by using the content of platinum, is about $1.90\times10^{-5}$ emu/g within a normal temperature range and an increase due to containment is observed. As is apparent from the graph showing a temperature dependence of the magnetic susceptibility shown in FIG. 22, it showed the temperature dependence in accordance with the Curie-Weiss's law and the Neel temperature was about −0.05K and the magnetic moment per 1 g of platinum was 1.541 $\mu b$.

Next, the case of the quantum wire platinum cluster grown in the thin line form along the pore in the mesoporous material will be described below. This quantum wire has a feature that the thin line diameter has a constant value because the mesoporous material pore is used as a template. The length of the thin line is about from 10 to 100 nm, along the pore. The orientation direction of the pores is constant in the mesoporous crystal but the whole sample does not have a specific orientation direction because the used mesoporous material is in the powder form. The temperature dependence of the magnetic susceptibility is shown in FIG. 23. The results can be explained by dividing the temperature range into two ranges. First, at low temperature range of absolute temperature of not more than 70K, it showed the temperature dependence in accordance with the Curie-Weiss's law and the Neel temperature was about −0.48K and the magnetic moment per 1 g of platinum was 0.131 $\mu b$. To the contrary, at high temperature range, unlike a paramagnetic behavior, the positive Neel temperature was about 41.1K and the magnetic moment per 1 g of platinum was about 0.084 $\mu b$. It has hitherto been understood that, since the super-paramagnetism observed in ferromagnetic fine particles is not the quantum effect due to containment into the microregion and the direction of all spins in the respective fine particles thermally fluctuate while maintaining the ferromagnetic order and, therefore, the fine particles as an aggregate behave like the paramagnetism of ions having huge spins. It is known that platinum used in this Example does not show the ferromagnetism in the bulk state but is an element having semi-ferromagnetism, such as palladium, and is easily converted into a ferromagnetic material in the alloy. It is considered that the magnetic characteristics of the platinum quantum wire cluster in this Example are obtained as follows, that is, the ferromagnetic interaction of platinum is enhanced by quantization and a macroscopic magnetism is expressed by spin fluctuation similar to the super-paramagnetism. Thus, a novel magnetic material, which has never been obtained, is provided.

Incidentally, since palladium, chrome and manganese have strong ferromagnetism, as well as platinum used in this Example, it is expected that the ferromagnetic characteristics at high temperature range are amplified. When using iron, nickel and cobalt, which show the ferromagnetism as a single metal, for producing the thin line, there is a possibility of showing a specific magnetism due to a cluster structure, unlike a conventional super-paramagnetism.

Comparative Example 1

Formation of cluster by means of light irradiation to Y type zeolite

Y type zeolite (manufactured by Tosoh Corporation, HSZ-320NAA, Lot, No. 3001, Si/Al=5.6, 910 $m_2$/g) (2 g) was suspended in distilled water (400 ml), to which was added slowly an aqueous solution prepared by dissolving rhodium trichloride trihydrate $RhCl_3.3H_2O$ (manufactured by Furuya Kinzoku Co., Ltd., Lot, No. 55NC101) (228 mg) in distilled water (200 ml) over about 3 to 4 hours. After the completion of the addition, the mixture was slowly heated from room temperature to 80° C. at a heating rate of 2° C. per minute, maintained at 80° C. for 12 hours, and then cooled to room temperature. Immediately after the addition of an aqueous rhodium ion solution, the color of the suspension is pink but changes to pale yellow after a lapse of time at 80° C. Subsequently, the whole suspension was filtered using a glass filter and separated into a precipitate and a filtrate. The precipitate was washed with distilled water until a chloride ion contained in the starting material disappeared. Incidentally, an aqueous silver nitrate solution was used for detection of the chloride ion. After the completion of washing, the precipitate was dried in an oven at 130° C. for 1 hour to make a sample for forming the cluster.

According to the same manner as that described in Example 9, saturated vapor of 2-propanol was introduced and then the light irradiation was conducted using a high-pressure mercury lamp. Incidentally, the light irradiation time was 6 hours. The color of the substance was changed from pale yellow to pale gray by light irradiation.

According to the same manner as that described in Example 9, a sample for measuring a transmission IR spectrum was obtained from the sample obtained by light irradiation, and then an IR spectrum was obtained under the same condition as that described in Example 9.

Figure 24:
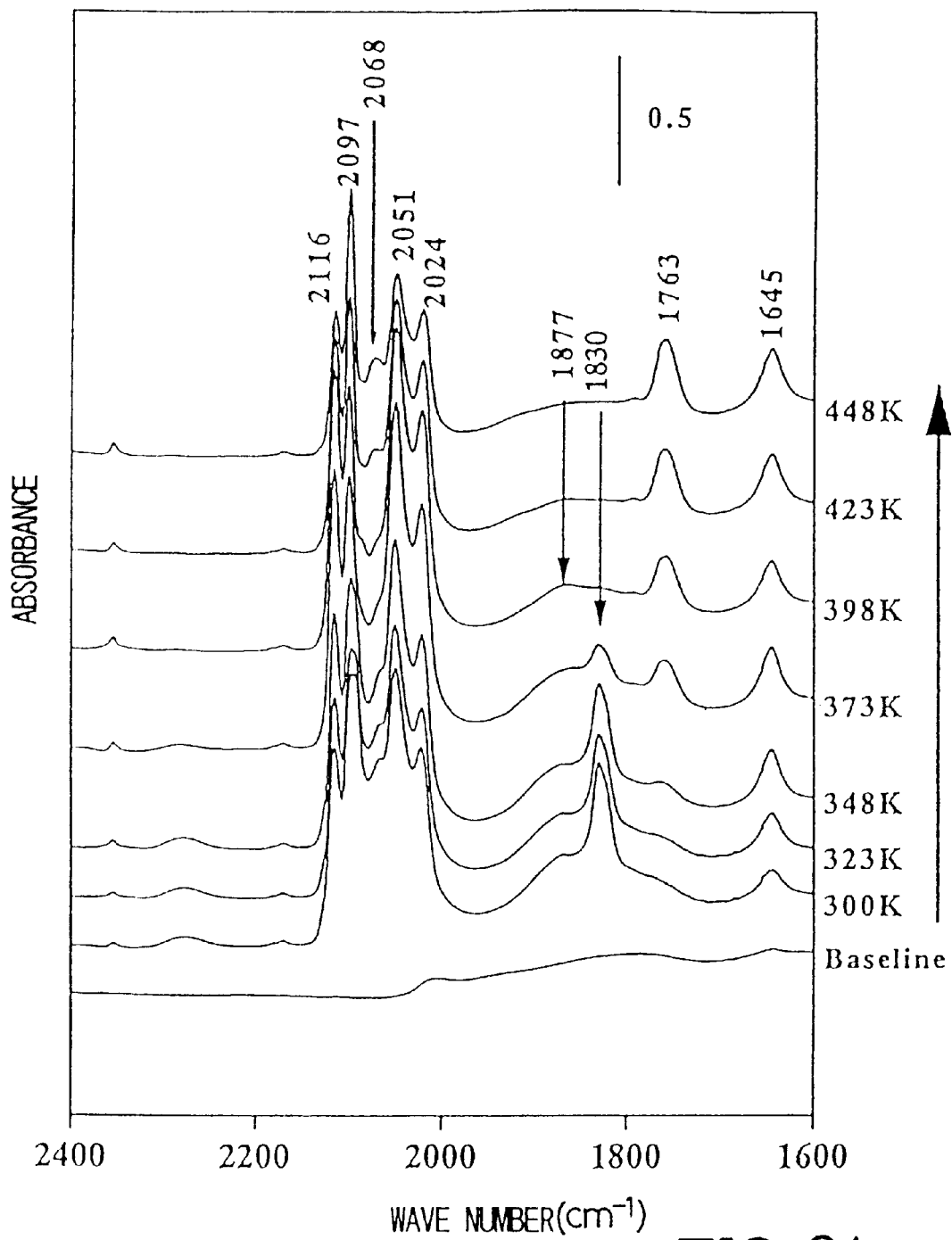
FIG. 24 shows a spectrum of powder X-ray diffraction of the sample obtained in Comparative Example 1.

That is, an adsorbed substance on the metal surface was eliminated by subjecting the sample obtained by light irradiation to an evacuation treatment in the cell at 200° C. for 30 minutes, and CO (13.3 kPa) was introduced. As a result, as shown in FIG. 24, CO absorption of $Rh^+(CO)2(Oz)_2$ was observed at 2097 $cm^{-1}$ and 2024 $cm^{-1}$, respectively, said absorption being attributed to symmetric or asymmetric expansion oscillation, and CO absorption of $Rh^+(CO)_2(Oz)(OH)$ was observed at 2116 $cm^{-1}$ and 2051 $cm^{-1}$, respectively, said absorption being attributed to symmetric or asymmetric expansion oscillation. In addition, absorption of a bridge of $Rh_6(CO)_{12}(\mu 2\text{-}CO)$ was observed at 1830 $cm^{-1}$. When a heat treatment is conducted at 50, 75, 100, 125, 150 and 175° C. under a CO atmosphere for 30 minutes, the absorption intensity gradually decreases while absorption of a bridge of $Rh_6(CO)_{12}(\mu_3\text{-}CO)_4$ appeared at 1763 $cm^{-1}$. When the heat treatment is conducted at 250° C., the above all absorptions disappeared and only an absorption of CO coordinated linearly to Rh particles was observed at 2070 $cm^{-1}$.

Comparative Example 2

Formation of cluster by means of γ-ray irradiation to Y type zeolite

According to the same manner as that described in Comparative Example 1, a sample for forming the cluster was made by using the Y type zeolite of Comparative Example 1.

This sample was sufficiently ground using an agate mortar and the ground substance (about 200 mg) was put in a quartz cell. After subjecting to an evacuation treatment at room temperature under vacuum of $10^{-2}$ to $10^{-3}$ Pa for 1 hour, vapor (6.7 kPa) of 2-propanol (manufactured by Wako Pure Chemical Industries Co., Ltd., 99.5% guaranteed) was introduced and γ-ray (radiation source: cobalt 60, 14.0 kGy) irradiation was conducted for 72 hours. The color of the substance was changed from pale yellow to pale gray by γ-ray irradiation.

According to the same manner as that described in Example 9, a sample for measuring a transmission IR spectrum was obtained from the cluster-included material obtained by γ-ray irradiation and, furthermore, the IR spectrum of this sample was obtained.

Figure 25:
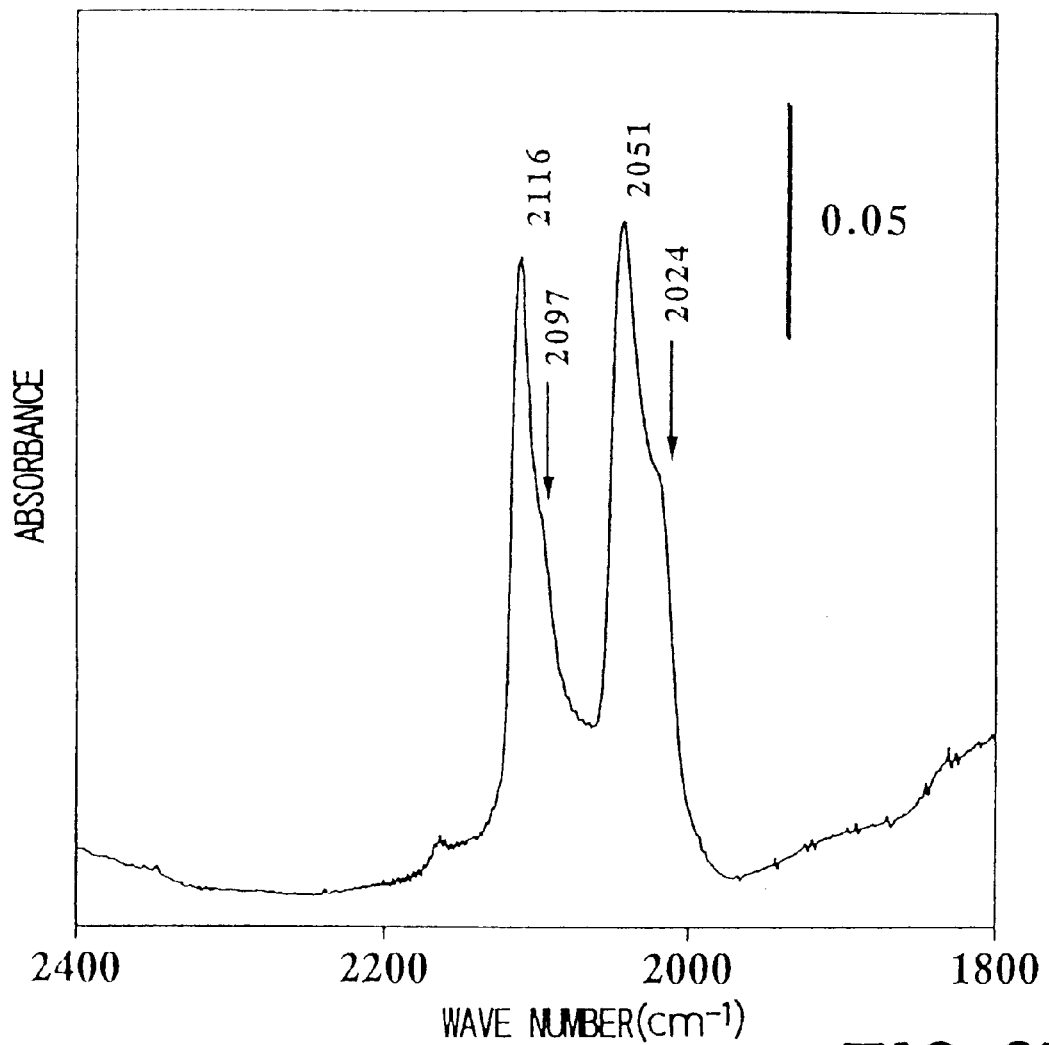
FIG. 25 shows a spectrum of powder X-ray diffraction of the sample obtained in Comparative Example 2.

That is, an adsorbed substance on the metal surface was eliminated by subjecting the sample obtained by γ-ray irradiation to an evacuation treatment in the cell at 200° C. for 30 minutes, and CO (13.3 kPa) was introduced. As a result, as shown in FIG. 25, CO absorption of $Rh^+(CO)2(Oz)_3$ was observed at 2097 $cm^{-1}$ and 2024 $cm^{-1}$, respectively, said absorption being attributed to symmetric or asymmetric expansion oscillation. and CO absorption of $Rh^+(CO)_2(Oz)(OH)$ was observed at 2116 $cm^{-1}$ and 2051 $cm^{-1}$, respectively, said absorption being attributed to symmetric or asymmetric expansion oscillation.

Example 12

Palladium chloride was dissolved in diluted hydrochloric acid and the solution was evaporated to dryness to make $H_2PdCl_4$. This was dissolved in distilled water to form an aqueous solution. FSM/16 synthesized in Example 1 was impregnated with this aqueous solution. The pore size is 2.7 nm and the Pd content was 5% by weight. Hereinafter, the product is referred to as an "intermediate".

This intermediate was reduced by the following four kinds of methods to obtain a cluster.

(First reducing method)

The intermediate was charged in a quartz cell and the atmosphere in the cell was adjusted (water: 20 torr, 2-propanol: 30 torr). Then, Pd was reduced by light irradiation for 30 minutes using a high-pressure mercury lamp (output: 500 watt) to obtain a cluster.

Figure 26:
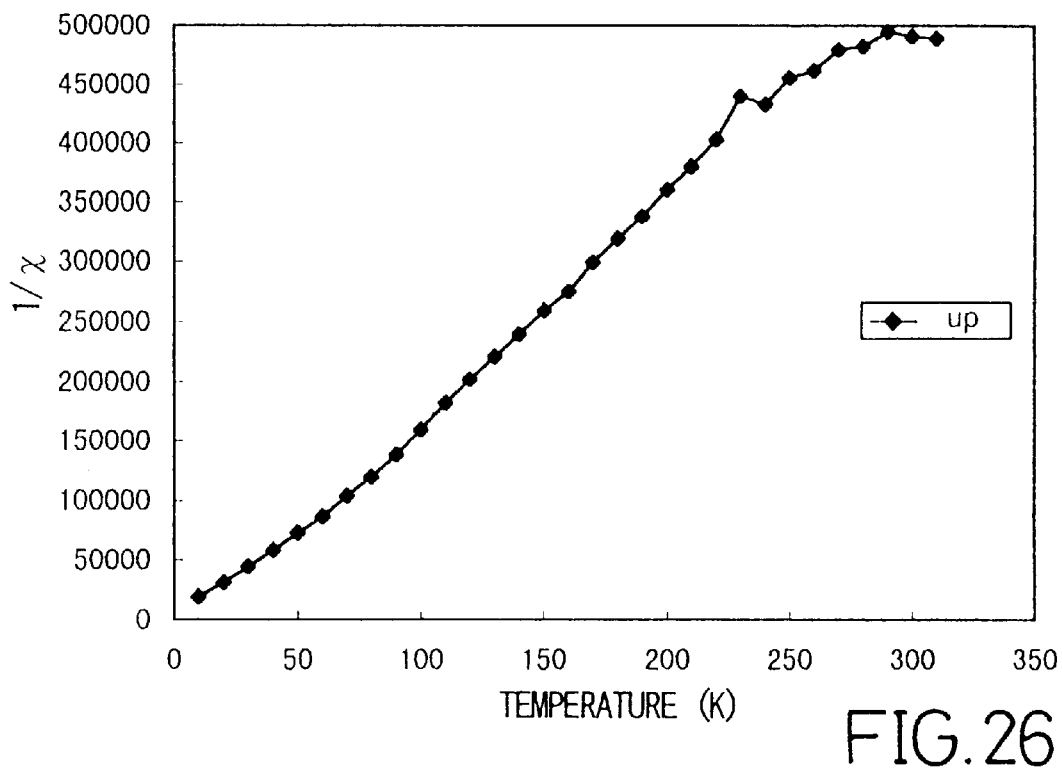
FIG. 26 shows magnetic characteristics of the cluster-included material obtained by the first reducing method of Example 12.
Figure 27:
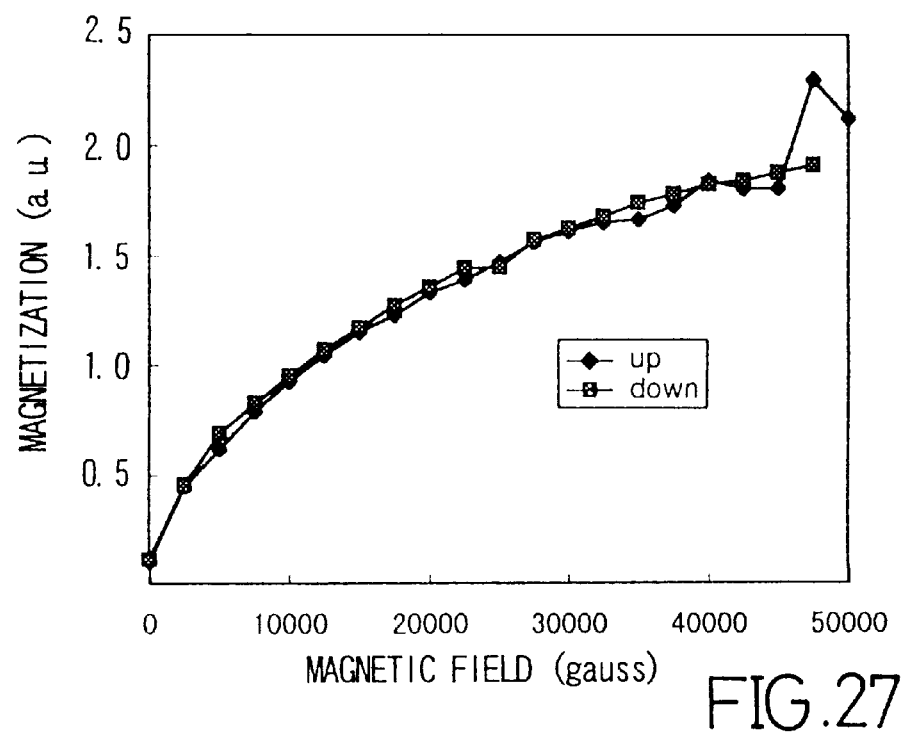
FIG. 27 shows magnetic characteristics of the cluster-included material obtained by the first reducing method of Example 12.

FIG. 26 and FIG. 27 show the results of magnetic characteristics of the resulting cluster-included materials, and the vertical axis of FIG. 26 indicates a reciprocal of a magnetic susceptivity (X) per 1 g of Pd while the vertical axis of FIG. 27 indicates a magnetic moment per 1 g of Pd. FIG. 27 shows the measurement results obtained as a result of the increase/decrease of the magnetic field. Both characteristics are different from those of the bulk Pd, and the quantum effect or granulization effect is expressed.

(Second reducing method)

The intermediate was charged in a quartz cell and the atmosphere in the cell was adjusted (water: 20 torr, 2-propanol: 30 torr, CO: 200 torr). Then, Pd was reduced by γ-ray irradiation for 3 hours using cobalt 60 as a radiation source to obtain a cluster.

Figure 28:
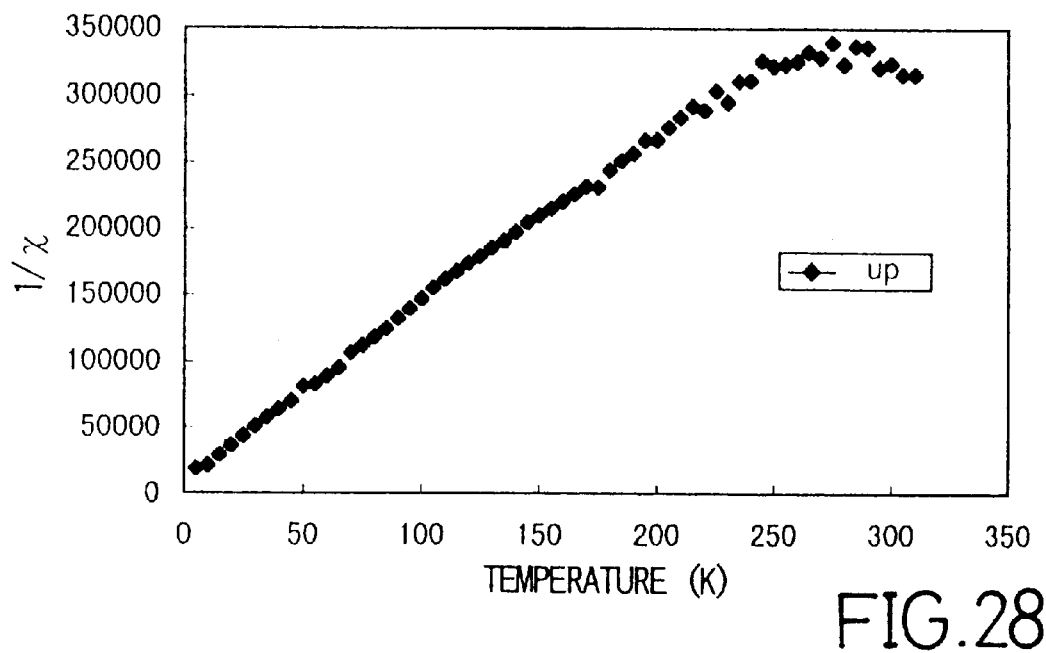
FIG. 28 shows magnetic characteristics of the cluster-included material obtained by the second reducing method of Example 12.
Figure 29:
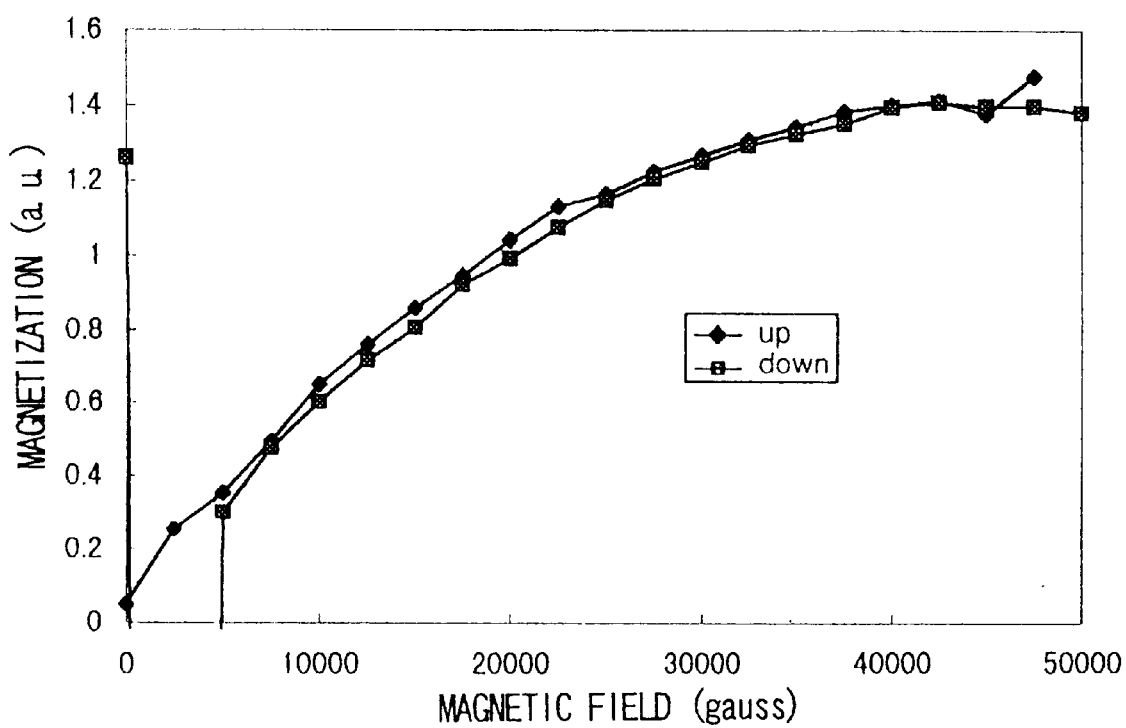
FIG. 29 shows magnetic characteristics of the cluster-included material obtained by the second reducing method of Example 12.

FIG. 28 and FIG. 29 show the results of magnetic characteristics of the resulting cluster-included materials, and are shown by the same vertical axis as those of FIG. 26 and FIG. 27. Both characteristics are different from those of the bulk Pd, and the quantum effect or granulation effect is expressed. (Third reducing method)

The intermediate was charged in a quartz cell and the atmosphere in the cell was adjusted (2-propanol: 50 torr). Then, Pd was reduced by continuously conducting the reaction to obtain a cluster.

Figure 30:
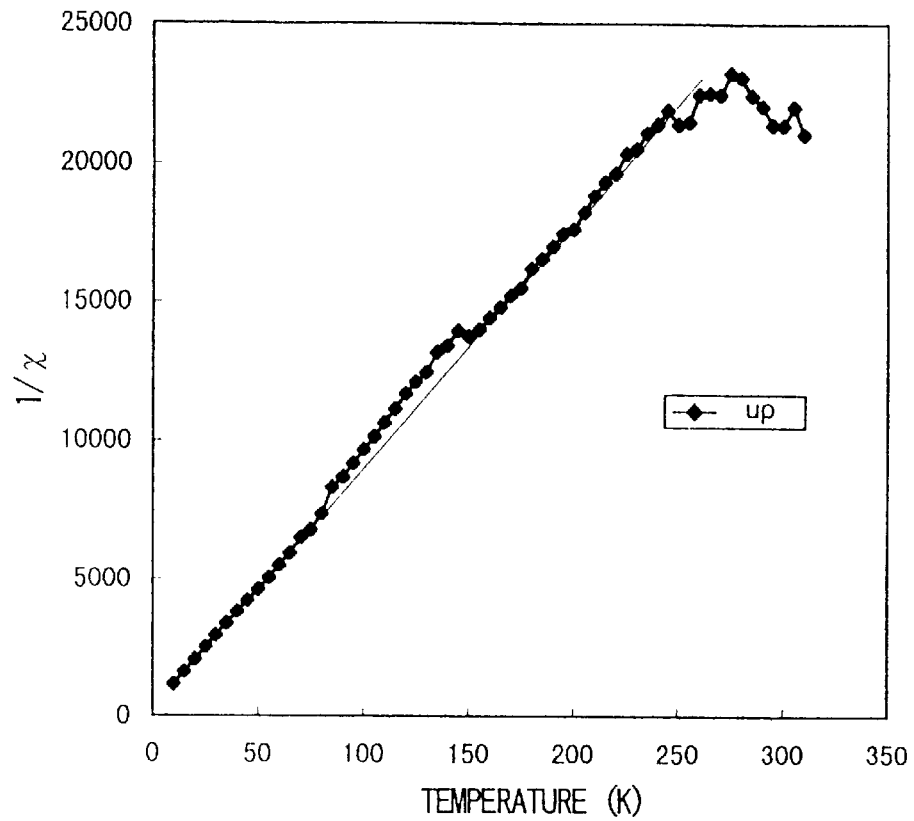
FIG. 30 shows magnetic characteristics of the cluster-included material obtained by the third reducing method of Example 12.
Figure 31:
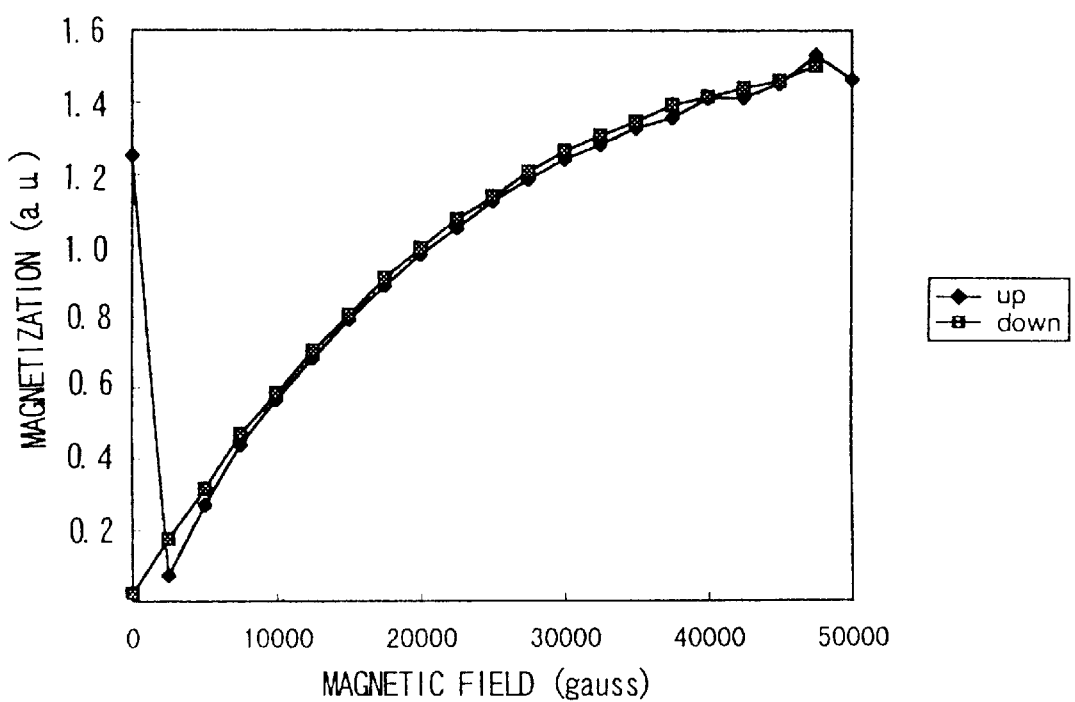
FIG. 31 shows magnetic characteristics of the cluster-included material obtained by the third reducing method of Example 12.

FIG. 30 and FIG. 31 show the results of magnetic characteristics of the resulting cluster-included materials, and are shown by the same vertical axis as those of FIG. 26 and FIG. 27. Both characteristics are different from those of the bulk Pd, and the quantum effect or granulation effect is expressed. (Fourth reducing method)

The intermediate was charged in a quartz cell and Pd was reduced by maintaining it in a hydrogen gas flow at 500° C. for 3 hours to obtain a cluster.

Figure 32:
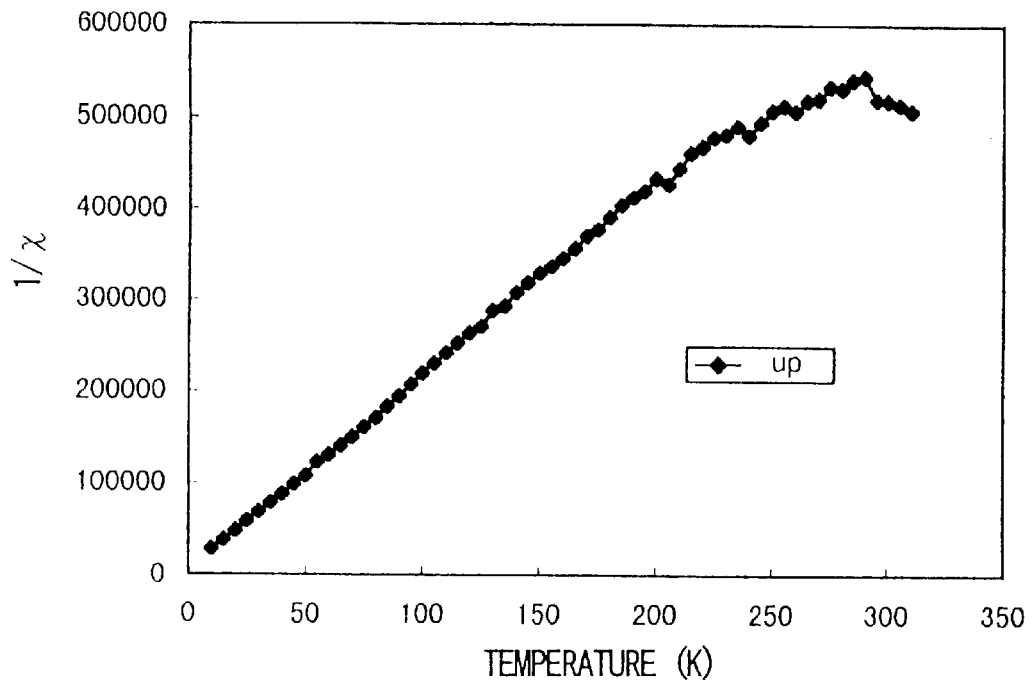
FIG. 32 shows magnetic characteristics of the cluster-included material obtained by the fourth reducing method of Example 12.
Figure 33:
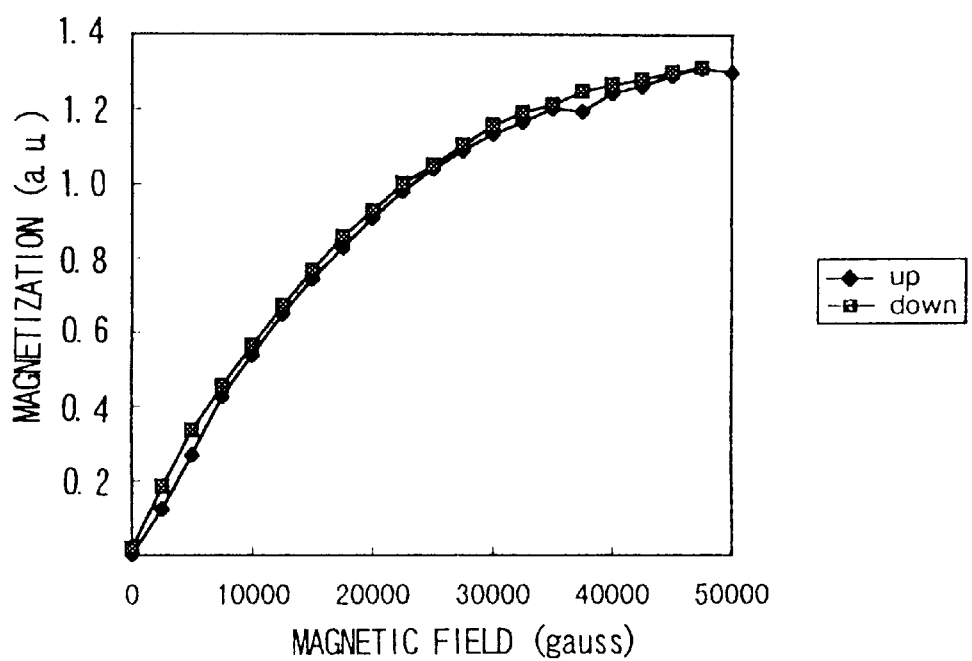
FIG. 33 shows magnetic characteristics of the cluster-included material obtained by the fourth reducing method of Example 12.

FIG. 32 and FIG. 33 show the results of magnetic characteristics of the resulting cluster-included materials, and are shown by the same vertical axes as those of FIG. 26 and FIG. 27. Both characteristics are different from those of the bulk Pd, and the quantum effect or granulation effect is expressed. (Other measurement results)

Figure 34:
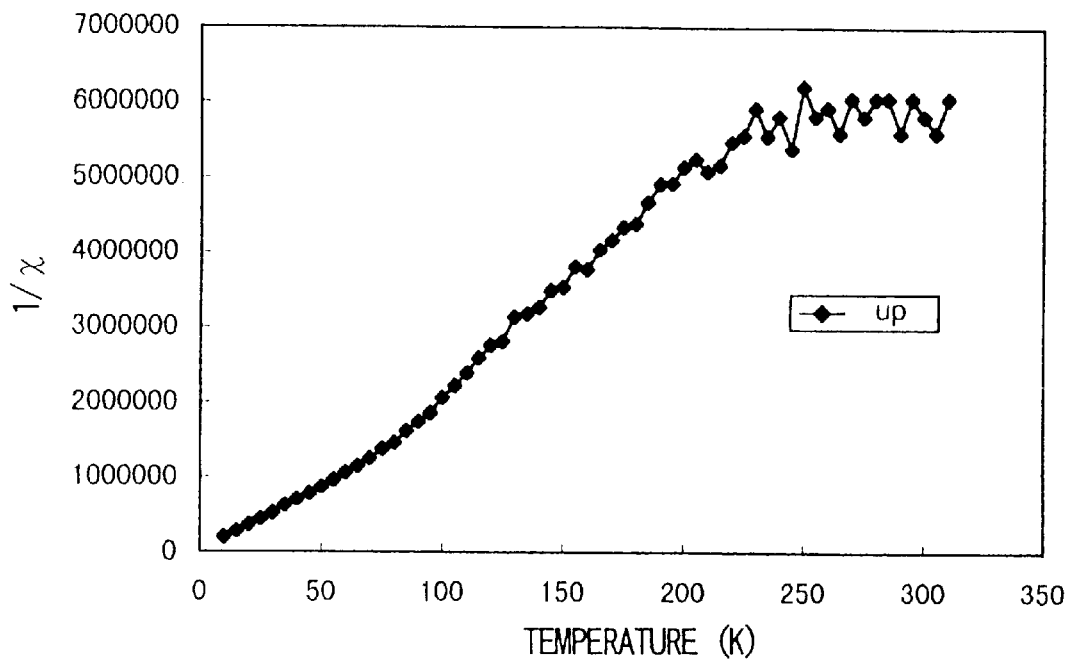
FIG. 34 shows magnetic characteristics of the luster-included material wherein clusters of Pt are formed in mesoporous material having a pore size of 4.7 nm.
Figure 35:
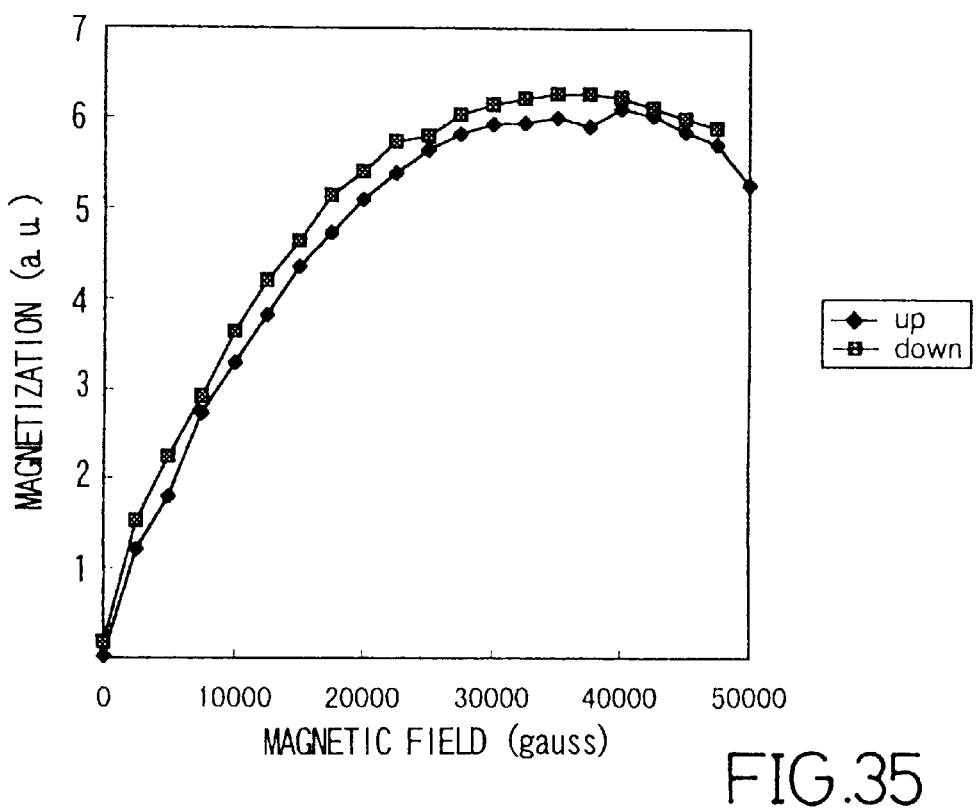
FIG. 35 shows magnetic characteristics of the luster-included material wherein clusters of Pt are formed in a mesoporous material having a pore size of 4.7 nm.

FIG. 34 and FIG. 35 show magnetic characteristics of the cluster-included materials, produced by forming clusters of Pt in FSM/M20 having comparatively large pores (pore size: 4.7 nm), and are shown by the same vertical axes as those of FIG. 26 and FIG. 27.

While the invention has been described with reference to preferred embodiments thereof, it is to be understood that modifications or variations may be easily made without departing from the scope of the present invention which is defined by the appended claims.

What is claimed is:

1. A composition comprising:
    a mesoporous material having a plurality of distributed pores, each pore having a pore diameter of 1.3 to 10 nm; and
    quantum wires having a diameter of 1.3 to 10 nm formed in the pores of the mesoporous material, wherein
    the quantum wires impart a magnetic function to the composition.

2. The composition according to claim 1, wherein a pore volume of pores in a pore size range of −40 to +40% of a pore size at a maximum peak in a pore size distribution curve occupies not less than 60% of a total pore volume of the mesoporous material.

3. The composition according to claim 1, wherein the mesoporous material has one or more peaks at a diffraction angle corresponding to a d-value of not less than 1 nm in a powder X-ray diffraction pattern.

4. The composition according to claim 1, wherein the quantum wires occupy not less than 10% of the mesoporous material by weight.

5. The composition according to claim 1, wherein the mesoporous material is produced by reacting a layered silicate with a surfactant.

6. The composition according to claim 5, wherein the layered silicate is at least one material selected from a group consisting of kanemite, sodium disilicate crystal, makatite, ilerite, magadiite and kenyaite.

7. The composition according to claim 5, wherein the layered silicate is produced by dissolving a salt of an element other than Si in a silicic acid solution and calcining the resulting solution.

8. The composition according to claim 1, wherein the mesoporous material is produced by impregnating a mesoporous material precursor comprising a layered silicate and a surfactant with an aqueous solution of a salt of an element other than Si, drying the impregnated mesoporous material precursor and calcining the dried mesoporous material precursor.

9. The composition according to claim 1, wherein the mesoporous material is produced by using a micellar structure of a surfactant as a template.

10. The composition according to claim 9, wherein the mesoporous material is produced by solidifying a mixed solution of an alkoxysilane and a surfactant represented by $C_nH_{2n+1}N(CH_3)_3X$, wherein n represents an integer of 2 to 18, and X represents a halide ion, or an organic anion and drying the solid.

11. The composition according to claim 1, wherein the quantum wires comprise a noble metal.

12. The composition according to claim 1, wherein the quantum wires are formed in the pores by
    introducing a quantum wire raw material into the mesoporous material, and
    irradiating the mesoporous material with light or γ-rays.

13. The composition according to claim 12, wherein the quantum wire raw material is a salt or complex salt of a noble metal.

14. The composition according to claim 1, wherein the quantum wires comprise lengths between 10 and 100 nm.

15. A method of making the composition of claim 1, the method comprising
    introducing a quantum wire raw material into a mesoporous material, and
    irradiating the mesoporous material with light or x-rays.

16. The composition according to claim 1, wherein the quantum wires comprise at least one element selected from the group consisting of Ni, Fe, Co, Mn, Pt, Pd, Rh, Ru, Ir, Au and Ag.

17. The composition according to claim 1, wherein the quantum wires comprise only one member selected from the group consisting of Ni, Fe, Co, Mn, Pt, Pd, Rh, Ru, Ir, Au and Ag.

18. A method of using a composition including mesoporous material and quantum wires, the method comprising
    providing a substrate, and
    forming a magnetic recording material including the composition of claim 1 on the substrate.

19. The method according to claim 18, wherein the quantum wires comprise lengths between 10 and 100 nm.

20. The composition according to claim 1, wherein each of the quantum wires consists of a single magnetic domain.

21. The composition according to claim 1, wherein the quantum wires comprise at least one magnetic metal material or magnetic metal oxide material.

22. The composition according to claim 21, wherein the at least one magnetic metal material or magnetic metal oxide material comprises a transition metal or transition metal oxide.

23. The composition according to claim 21, wherein the at least one magnetic metal material or magnetic metal oxide material is ferromagnetic.

24. A composition comprising:

a mesoporous material having one dimensional pores in a form of a tunnel, each pore having a pore diameter of 1.3 to 10 nm; and quantum wires formed in the pores and having diameters of 1.3 to 10 nm, wherein the quantum wires impart a magnetic function to the composition.

25. A composition comprising:

a mesoporous material having a plurality of distributed pores, each pore having a pore diameter of 1.3 to 10 nm; and quantum wires having a diameter of 1.3 to 10 nm formed in the pores of the mesoporous material, wherein the quantum wires comprise at least one magnetic metal material or magnetic metal oxide material.

* * * * *

UNITED STATES PATENT AND TRADEMARK OFFICE
CERTIFICATE OF CORRECTION

PATENT NO. : 6,107,243
DATED : August 22, 2000
INVENTOR(S) : Shinji Inagaki, et al.

It is certified that error appears in the above-identified patent and that said Letters Patent is hereby corrected as shown below:

Column 22,
Line 40, "material with light or x-rays." should read -- material with light or γ -rays. --

Column 23,
Between lines 9 and 10, insert -- the quantum wires comprise at least one magnetic metal material or magnetic metal oxide material; and --

Signed and Sealed this

Eleventh Day of September, 2001

*Attest:*

NICHOLAS P. GODICI
*Attesting Officer*    *Acting Director of the United States Patent and Trademark Office*